(12) United States Patent
Ito et al.

(10) Patent No.: US 6,484,093 B1
(45) Date of Patent: Nov. 19, 2002

(54) COMMUNICATION ROUTE GUIDANCE SYSTEM

(75) Inventors: Yasuo Ito, Hokkaido (JP); Naoki Gorai, Hokkaido (JP); Takashi Sugawara, Hokkaido (JP); Satoshi Kitano, Hokkaido (JP); Hiroyuki Yamakawa, Hokkaido (JP)

(73) Assignee: Kabushikikaisha Equos Research (JP)

( * ) Notice: Subject to any disclaimer, the term of this patent is extended or adjusted under 35 U.S.C. 154(b) by 165 days.

(21) Appl. No.: 09/714,601

(22) Filed: Nov. 17, 2000

(30) Foreign Application Priority Data

Nov. 18, 1999 (JP) .......................................... 11-367705

(51) Int. Cl.⁷ .............................................. G01C 21/34
(52) U.S. Cl. ........................ 701/211; 701/209; 701/210; 701/202; 340/990; 340/995
(58) Field of Search ................................ 701/202, 207, 701/209, 210, 211; 73/178 R; 340/988, 990, 995

(56) References Cited

U.S. PATENT DOCUMENTS

| | | | |
|---|---|---|---|
| 5,543,789 A | | 8/1996 | Behr et al. .................. 340/995 |
| 5,610,821 A | | 3/1997 | Gazis et al. ............. 364/444.2 |
| 5,712,632 A | | 1/1998 | Nishimura et al. ......... 340/995 |
| 5,839,086 A | | 11/1998 | Hirano ....................... 701/201 |
| 5,941,930 A | * | 8/1999 | Morimoto et al. .......... 701/211 |
| 5,948,040 A | | 9/1999 | DeLorme et al. ........... 701/201 |
| 6,073,075 A | * | 6/2000 | Kondou et al. ............. 701/211 |
| 6,094,618 A | * | 7/2000 | Harada ....................... 701/207 |
| 6,263,276 B1 | * | 7/2001 | Yokoyama et al. ......... 340/988 |
| 6,278,941 B1 | * | 8/2001 | Yokoyama .................. 701/209 |
| 6,282,492 B1 | * | 8/2001 | Gorai et al. ................ 701/209 |
| 6,338,020 B2 | * | 1/2002 | Hashimoto .................. 340/995 |

FOREIGN PATENT DOCUMENTS

| | | |
|---|---|---|
| JP | 10-19588 | 6/1996 |
| JP | 10-160497 | 11/1996 |
| JP | 11-187456 | 12/1999 |
| WO | 99/27323 | 11/1998 |

* cited by examiner

*Primary Examiner*—Gary Chin
(74) *Attorney, Agent, or Firm*—Lorusso & Loud

(57) ABSTRACT

A communication route guidance system provides exchange of data between an information center and each of a plurality of mobile units such as vehicles. The information center has the latest road data and searches it to prepare recommended route guidance data in response to a request from the mobile unit. The reccommended route guidance data is divided into a plurality of data segments, each usable as an independent guidance instruction in the mobile unit. The mobile unit has stored therein road data similar to the road data in the information center and determines if data communication with the information center is available. In a case where the mobile unit can not communicate with the information center, the mobile unit prepares route guidance based on the road data stored in the mobile unit. It thereby becomes possible to guide the user even in the case that the mobile unit can not communicate with the information center. Even in a case where a communication link is disrupted during transmission of route guidance data to the mobile unit, the mobile unit can effectively prepare whole route guidance data in combination with already-received route guidance data and additionally prepared route guidance data by reference to the road data stored in the mobile unit because the already received route guidance data is structured to be usable independently.

22 Claims, 13 Drawing Sheets

COMMUNICATION ROUTE GUIDANCE SYSTEM

TECHNICAL FIELD

The present invention relates to a communication route guidance system for guiding a mobile unit to a destination and, more particularly, to a communication route guidance system which enables communication between a remote information center and at least one mobile unit, both storing road data. The mobile unit is equipped with a communication terminal.

BACKGROUND OF THE INVENTION

Japanese patent laid-open publication No.10-19588 discloses an example of the prior art communication route guidance system wherein map image data, recommended route data (or optimum route data) and other data necessary in route guidance is transmitted from a remote information center to a mobile unit. In this system, the information center operates, in response to a request from the mobile unit, to read out necessary data from a database and to prepare the map image data. The remote information center also conducts a route search operation to prepare the optimum route data. The information center then transmits the map image data and the optimum route data thus prepared to the mobile unit. The mobile unit guides the user of the mobile unit to the destination in accordance with such data transmitted from the information center.

In some cases, however, the mobile unit is not capable of receiving data from the information center when the mobile unit is in an area where little or no such communication is available. Such an area is hereinafter referred to as a "non-communication" area. There will also be occasions when such communication will not be available because of problems or breakdown at the remote information center.

SUMMARY OF THE INVENTION

Accordingly, it is a primary object of the present invention to provide a novel communication route guidance system which is capable of guiding a mobile unit to a destination even when the mobile unit is unable to communicate with the information center, e.g. when the mobile unit is in a non-communication area or the system in the information center has broken down.

To achieve the above object, in accordance with a first aspect of the present invention, there is provided a communication route guidance system wherein an information center transmits route information to a mobile unit for guiding the mobile unit from its current position to a destination, in response to a request from the mobile unit, wherein the information center includes: first communication means for transmitting and receiving data to and from said mobile unit; first memory means for storing first road data; and first route search means for searching the first road date to obtain first route guidance data for guiding the mobile unit from its current position to the destination in accordance with information transmitted from the mobile unit through the first communication means and identifying the current position and a destination, responsive to a request from the mobile unit for a route search. The information center is further provided with data dividing means for dividing said first route guidance data into a plurality of data segments, each data segment being usable in said mobile unit as an independent item of route information providing guidance from a near end of a route segment (corresponding to the data segment) to the opposite, remote end of the route segment. The mobile unit, in turn, includes: second communication means for transmitting and receiving data to and from the information center; second memory means for storing second road data; second route search means for conducting a route search of the second road data to obtain second route guidance data for guiding the mobile unit from the current position to the destination; third memory means for storing at least one of the data segments transmitted from the information center through said first and second communication means; sensor means for detecting whether data is communicable with said information center through said first and second communication means; and route guidance means for guiding the mobile unit to the destination in accordance with at least one of said second route guidance data and said at least one data segment stored in the third memory means, the route guidance means guiding the mobile unit to the destination in accordance with the second route guidance data when the sensor means detects inability to communicate between the mobile unit and the information center.

As used herein, "segmental data" has reference to a series of the data segments described above.

In a preferred embodiment of the first aspect of the present invention described above, the information center further includes information collection means for obtaining the latest traffic and road information, the first road data stored in the first memory means being updated in response to the latest traffic and road information obtained by the information collection means.

In another preferred embodiment of the first aspect of the present invention, when the mobile unit has been guided by the second route guidance data obtained by the second route search means and the sensor means has detected that data communication is available with said information center, the first route search means searches for a new optimum route to obtain new route guidance data for guiding the mobile unit from its current position to the destination in response to a request from the mobile unit, the new route guidance data being divided by said data dividing means into a plurality of said data segments which are transmitted to the mobile unit for storage in the third memory means. In this embodiment, the sensor means may comprise measurement means for measuring field intensity of a radio wave in data transmission from the information center and means for judging that data can not be communicated between the mobile unit and the information center when the measured field intensity is below a predetermined threshold level. Alternatively, the sensor means may comprise means for judging that data can not be communicated when the mobile unit receives no data segment from the information center within a predetermined time period after transmitting a request to the information center. The sensor means may also comprise communication area data memory means for storing data specifying communication areas in which the mobile unit can be in communication with the information center; and means for judging, in accordance with that data stored in the communication area data memory means, that no data communication is available between the mobile unit and the information center when the mobile unit is not within any of the specified communication areas.

In accordance with a second aspect of the present invention, there is provided a communication route guidance system wherein an information center transmits route information to a mobile unit for guiding the mobile unit from its current position to a destination, in response to a request from said mobile unit, wherein the information center includes: first communication means for receiving current position and destination from the mobile unit and transmitting data segments to the mobile unit; first memory means for storing road data; route search means for searching the stored road data to obtain route guidance data for guiding the mobile unit from its current position to the destination; data dividing means for dividing the thus obtained route guidance data into a plurality of data segments, each data segment being usable in said mobile unit as an item of route information providing guidance from a near end of a route segment (corresponding to the data segment) to the opposite, remote end of the route segment; communication area data memory means for storing data specifying communication areas wherin the mobile unit can communicate with the information center through the first communication means; and transmission route length determining means for determining number of data segments in a continuous series of data segments to be transmitted to the mobile unit while travelling within one of the specified communication areas, and for locating the extreme ends of that continuous series of data segments data within the one communication area, i.e. a near end and a far end. In this second aspect of the present invention the mobile unit includes second communication means for transmitting the current position and destination to the information center and for receiving the segmental data from the information center, second memory means for storing the received segmental data, and route guidance means for guiding said mobile unit to said destination in accordance with the segmental data stored in the second memory means.

In a preferred embodiment of the second aspect of the present invention, the information center further includes information collection means for obtaining the latest traffic and road information, the road data stored in the first memory means being updated in response to the latest traffic and road information obtained by the information collection means.

In another preferred embodiment of the second aspect of the present invention the mobile unit transmits a request to the information center for guidance to the destination, each time when a length of the remaining route for which guidance is provided by the continuous series of said segmental data which the mobile unit has last received from the information center becomes shorter than a predetermined distance, and the route search means plans said route guidance data each time the information center receives a request from the mobile unit.

In still another preferred embodiment of the second aspect of the present invention, the mobile unit transmits the requests to the information center at a predetermined periodic time interval or a predetermined increment of distance travelled by the mobile unit, and the route search means obtains route guidance data for guiding the mobile unit to the destination responsive to each of the requests.

In still another preferred embodiment of the second aspect of the present invention the route search means plans the route guidance data for guiding the mobile unit from its current position to the destination at a predetermined periodic interval in time or at a predetermined increment of distance travelled by the mobile unit.

In accordance with a third aspect of the present invention, there is provided a communication route guidance system wherein an information center transmits route information to a mobile unit for guiding the mobile unit from its current position to a destination, in response to a request from the mobile unit, wherein the information center includes: first communication means for transmitting and receiving data to and from said mobile unit; first memory means for storing first road data; first route search means for ksearching the first road data to obtain first route guidance data for guiding the mobile unit from its current position to the destination, the current position and the destination being transmitted from the mobile unit through the first communication means; and data dividing means for dividing the first route guidance data into a plurality of data segments, each data segment being usable in said mobile unit as an independent item of route information for guiding the mobile unit from one extreme end of a route segment (corresponding to the data segment) to the other end thereof. In this third aspect of the present invention the mobile unit includes second communication means for transmitting and receiving data to and from said information center; second memory means for storing second road data; second route search means for searching the stored second road data to obtain second route guidance data for guiding the mobile unit from its current position to the destination; third memory means for storing at least one of the data segments transmitted from the information center through the first and second communication means; route guidance means for guiding the mobile unit to the destination along a guide route defined by at least one segment of the second route guidance data obtained by the second route search means and the at least one data segment stored in said third memory means; first sensor means for detecting whether data can be communicated with the information center through the first and second communication means; and second sensor means for detecting that the mobile unit has strayed from the guide route; wherein the second route search means is responsive to both detection by the second sensor means that the mobile unit has strayed from the guide route and detection by the first sensor means that data cannot be communicated between the mobile unit and the information center to plan restoration route guidance data for guiding and returning the mobile unit to the guide route along which it had been guided by the route guidance means before departure therefrom detected by the second sensor means.

In a preferred embodiment of the third aspect of the present invention, the information center further includes information collection means for obtaining the latest traffic and road information, the first road data stored in said first memory means being updated in response to said latest traffic and road information obtained by the information collection means.

In another preferred embodiment of the third aspect of the present invention, the mobile unit transmits a request to the information center for guidance to the destination, each time the length of the guide route remaining guidable by the last continuous series of said segmental data received by transmission from the information center becomes shorter than a predetermined distance, and the first route search means obtains first guidance data each time the information center receives a request for guidance from the mobile unit.

In still another embodiment of the third aspect of the present invention, the mobile unit transmits requests to the information center at a predetermined periodic interval of time or at a predetermined increment of distance travelled by the mobile unit. and the first route search means plans first route guidance data for guiding the mobile unit from its current position to the destination each time the information center receives a request from the mobile unit.

In still another embodiment of the third aspect of the present invention, the first route search means obtains (plans) the first route guidance data for guiding the mobile unit from its current position to the destination at a predetermined increment of distance travelled by the mobile unit.

In accordance with a fourth aspect of the present invention, there is provided a communication route guidance system wherein an information center transmits route information to a mobile unit for guiding the mobile unit from its current position to a destination, in response to a request from said mobile unit, wherein the information center includes: first memory means for storing first location data for identifying a location by designation of at least one of the telephone number and address thereof; and first route search means for obtaining (planning) first route guidance data, for guiding the mobile unit from its current position to the destination, by reference to the first location data stored in the first memory means. In this fourth aspect the mobile unit includes: input means for inputting at least one of the telephone number and address of the destination, as destination information; communication means for transmitting the current position and the destination information to the information center and for receiving route guidance data from the information center; second memory means for storing second location data capable of specifying a location in accordance with the destination information; sensor means for detecting whether data communication with the information center is available through the communication means; second route search means for obtaining (planning) second route guidance data for guiding the mobile unit from its current position to the destination by searching the second location data stored in the second memory means, when the sensor means detects that said information input by the input means cannot be transmitted to the information center; and route guidance means for guiding the mobile unit to the destination in accordance with at least one of said first and second route guidance data.

In a preferred embodiment of the fourth aspect of the present invention, when the mobile unit has been guided by the second route guidance data obtained by the second route search means and when the sensor means has detected that data communication with the information center has become available, in response to a request from the mobile unit, the first route search means obtains new route guidance data for guiding the mobile unit from its current position to the destination, whereby the route guidance means guides the mobile unit in accordance with the new route guidance data.

In another preferred embodiment of the fourth aspect of the present invention, the second location data stored in the second memory means contains data specifying a representative location within an area including a location to be designated by input of telephone number and/or address through the input means.

In still another preferred embodiment of the fourth aspect of the present invention, the sensor means includes measurement means for measuring field intensity of a radio wave in data transmission from the information center and means for judging that data cannot be communicated with the information center when the measured field intensity is below a threshold level.

In still another preferred embodiment of the fourth aspect of the present invention the sensor means comprises means for judging that data cannot be communicated with the information center when the mobile unit receives no first route guidance data from the information center within a predetermined time period after transmitting a request to the information center.

In still another preferred embodiment of the fourth aspect of the present invention the sensor means comprises communication area memory means for storing data specifying, as communication areas, areas in which the mobile unit can communicate with the information center: and means for judging, in accordance with data stored in the communication area memory means, that there can be no communication between the mobile unit and the information center when the mobile unit is not within any of the communication areas.

Typical examples of the mobile unit mentioned above include, not only a vehicle in which navigation apparatus is mounted and a hand-held navigation apparatus for use by a pedestrian. but also personal computers, laptop computers, personal digital assistant (PDA), cellular phones, and pagers. However, in the description of the preferred embodiments which follows, in the interest of brevity, description of the mobile unit will be limited to a vehicle in which a navigation apparatus is mounted.

BRIEF DESCRIPTION OF THE DRAWINGS

The above and other objects of the present invention will become apparent from the following description when read in conjunction with the accompanying drawings in which.

DESCRIPTION OF PREFERRED EMBODIMENTS

A preferred embodiment of the present invention will now be described with reference to the accompanying drawings.

Figure 1:
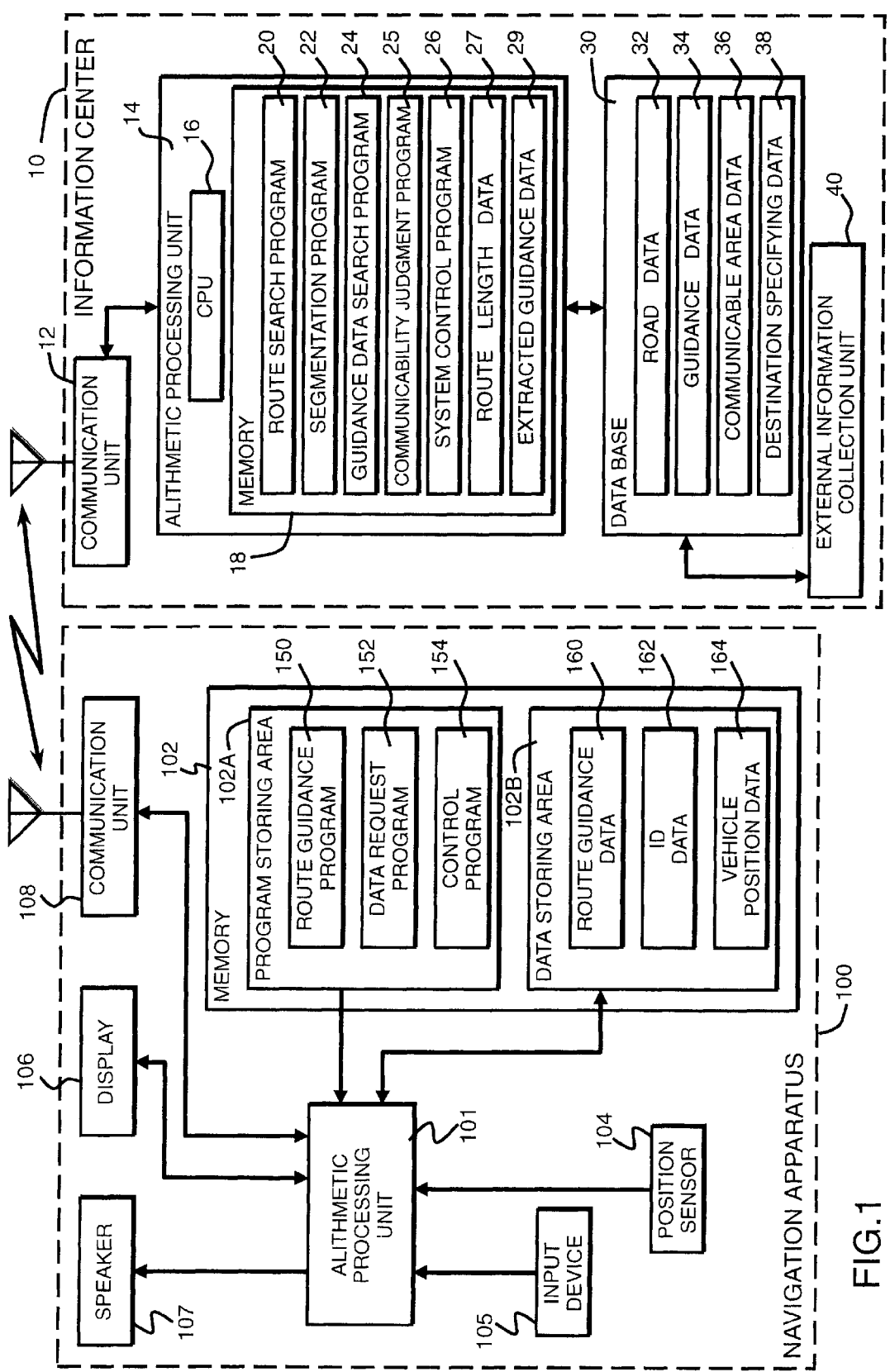
FIG. 1 is a block diagram showing an arrangement of a communication route guidance system embodying the present invention.

FIG. 1 shows the overall arrangement of a communication route guidance system of one preferred embodiment of the present invention including an information center 10 and a navigation apparatus 100 mounted on a vehicle. In information center 10, there is a communication unit 108, including a transmitter and a receiver, which provides for data transmission to and from the navigation apparatus 100. Communication unit 108 may be a car phone. cellular phone. portable handy phone system (PHS), etc. An arithmetic processing unit 14 includes a central processing unit (CPU) 16 that executes various processing and control operations and a memory 18 that stores various programs and data.

More particularly, memory 18 stores a route search program 20 for searching to determine a route from a current vehicle position (that is a vehicle position at the time the navigation operation starts or a starting point) to a destination (where the navigation operation terminates), a segmentation program 22 for dividing a planned route into route segments and for determining a route length to be transmitted to navigation apparatus 100, a guidance data search program 24 for searching, extracting and editing guidance data corresponding to the route length determined by the segmentation program 22, a communication judgment program 25 for judging whether or not data transmission is possible. a system control program 26 for controlling and managing the overall operation, and other programs to be executed by information center 10. Memory 18 has also a working area for use in execution of these programs.

Database 30 stores road data 32 for searching a route to the the destination, guidance data 34 including plural data segments for guiding the user of the navigation apparatus to the destination along a searched route, communication area data 36 including plural data items identifying areas in which data communication with the information center is possible, destination specifying data 38 including coordinates of various points in combination with their telephone numbers and/or addresses which may be used in determination of destinations, and other data to be used in route search and route guidance. The road data 32 typically includes road network data including crossing data and node data. The guidance data 34 includes map data of for crossing and roads, landmark data and voice guidance data. The communication area data 36 is the data which specifys the area in which the navigation apparatus can communicate with the information center.

An external information collection unit 40 is connected to database 30 for obtaining the latest information regarding roads, traffic and communication conditions from other information centers by means of telephone lines or other communication devices.

Typical examples of the latest information include information of traffic jams, traffic accidents, road repairing, traffic restriction, newly-constructed roads, newly-established institutions, changes in the areas where communication is and is not available, etc. The latest information is used to update data stored in database 30. Some types of the latest information such as information of traffic jams, traffic accidents, road repairing, traffic restriction, newly constructed roads, newly-established institutions, etc. should be correlated with location and date (and time) of its occurrence. For example, the traffic jam information should be obtained with location and date-and-time where and when a traffic jam occurs. This is also true of the traffic accident information.

In navigation apparatus 100, there is an arithmetic processing unit 101 which typically includes a central processing unit (CPU). A program storing area 102A of a memory 102 stores a route guidance program 150 for representing a drive route and landmarks therearound on a display 106 and outputting a route guidance message through a voice output device or a speaker 107 in accordance with route guidance data transmitted from information center 10, a data request program 152 for requesting new route guidance data for guiding the user of the navigation apparatus along a next drive route by comparison between the current vehicle position and the route guidance data now in operation, a control program 154 for controlling the overall operation, and other programs to be executed by arithmetic processing unit 101.

Data storing area 102B of memory 102 has a working area for use in execution of those programs. Additionally, route guidance data 160 (which comprises route data and guidance data) transmitted from information center 10, ID data 162 identifying the navigation apparatus 100, and vehicle position data 164 (which comprises latitude and longitude of vehicle position) detected by a position sensor 104 are also stored in data storing area 102B.

The vehicle position is detected by position sensor 104 at predetermined time intervals. Vehicle position data 164 comprises a series of the vehicle positions obtained by the latest several detections of position sensor 104. For example, a series of the past vehicle positions within a predetermined distance, or a predetermined number of the past vehicle positions may be stored as vehicle position data 164. Once position sensor 104 detects a new vehicle position, vehicle position data 164 is updated such that the new vehicle position is added as the latest data and the oldest one is removed. A series of the past vehicle positions represents a track of movement of the vehicle. The track of movement of the vehicle may be used in a so-called map-matching operation to identify the road on which the vehicle is running.

Position sensor 104 has a Global Positioning System (GPS) receiver which receives radio waves from plural earth satellites to determine absolute coordinates of the vehicle current position. Position sensor 104 may also have a speed meter and a compass, both of which are used to determine a relative position of the vehicle by dead reckoning. The relative position determined by those sensors may be used in a case when no radio waves are receivable by the GPS receiver or when the vehicle is running through a tunnel. The relative vehicle position may also be used to eliminate an error in the absolute vehicle position detected by the GPS receiver.

An input device 105 may include various switches, a touch panel attached to a front panel of display 106, a remote control unit and a voice input unit. In data inputting with the touch panel, a touch by a user's finger on a particular icon shown on display 106 will input corresponding data or command. The voice input unit receives and recognizes the user's voice so that corresponding data or command may be inputted.

Display 106 may comprise a liquid crystal display (LCD) or a cathode-ray tube (CRT) with the above-described touch panel. A communication unit 108 includes a transmitter and a receiver, which allows data transmission to and from the information center 10. As described before in connection with communication unit 12 in information center 10, communication unit 108 may include a car phone, cellular phone, PHS, etc.

Operation at Information Center

Figure 2:
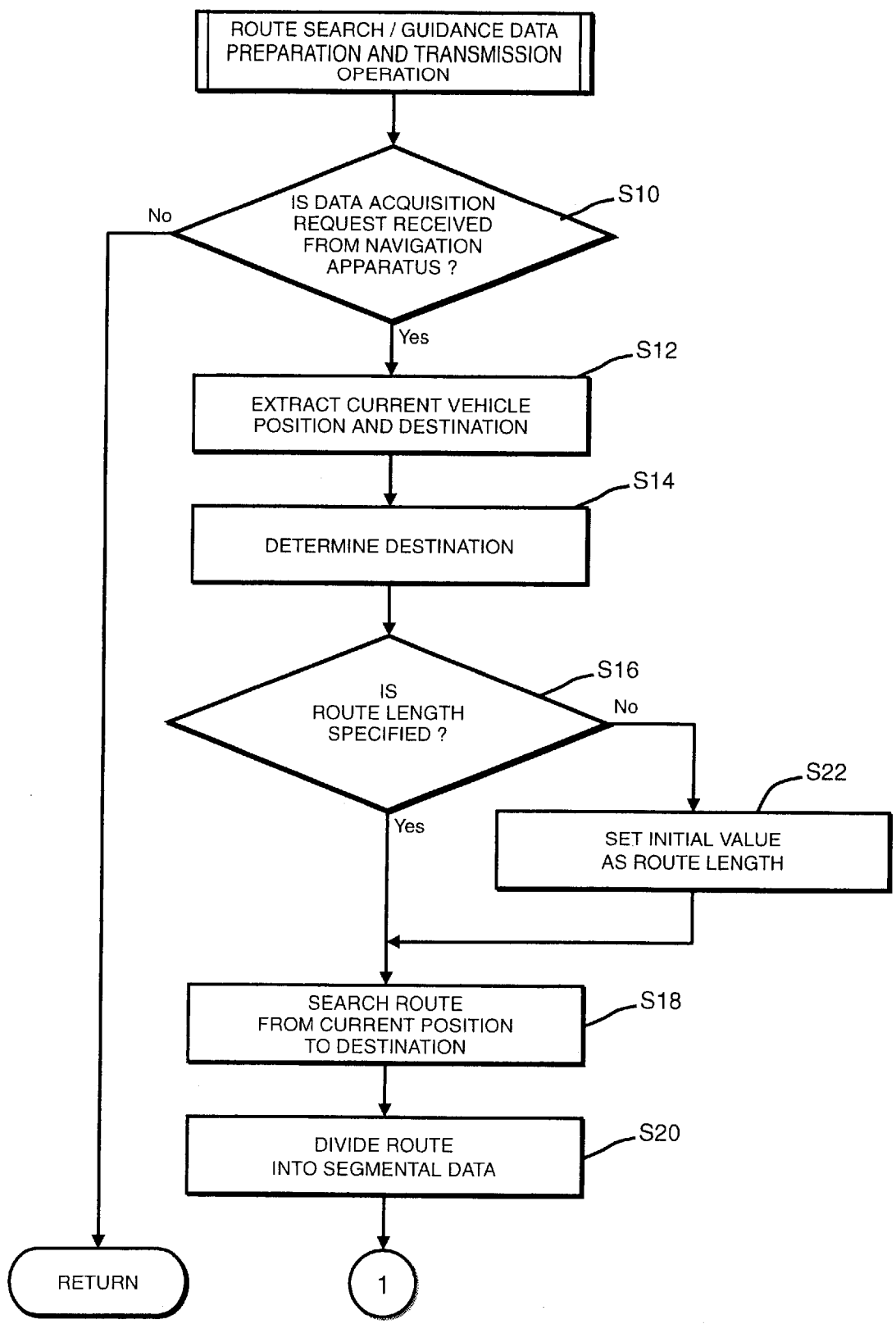
FIGS. 2 and 3 show a flowchart of a routine for route searching, preparation of guidance data and transmission of the prepared guidance data, which routine is executed at the information center.
Figure 3:
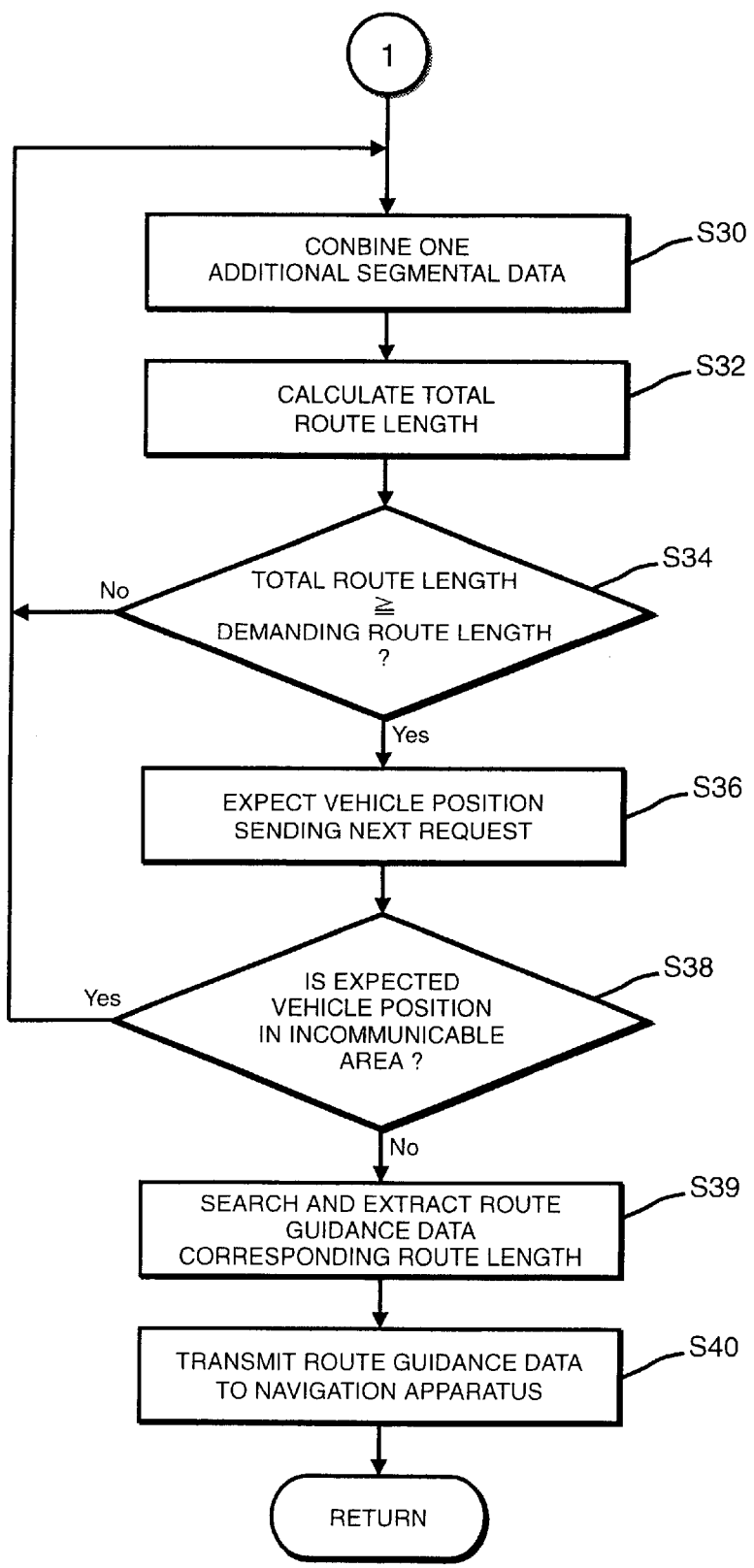

FIGS. 2 and 3 show a flowchart of route guidance data preparation and transmission operations executed at the information center. Before execution of these operations, control program 151 stored in memory 102 has been executed by arithmetic processing unit 101 in navigation apparatus 100. When the data request program 152 stored in memory 102 is executed in response to the user's input operation through input device 105, data including the current vehicle position detected by position sensor 104, the destination, and the route segment (length) along which the navigation apparatus requires route guidance from information center 10 are transmitted to information center 10 through communication unit 108 (as shown by a step S50 in the flowchart of FIG. 6 to be described later). An ID code distinguishing the owner's navigation apparatus from other navigation apparatus units is also transmitted to information center 10 at the same time. Information center 10 receives this data through communication unit 12 ("Yes" in step S10) and transfers the same to arithmetic processing unit 14. Communication between information center 10 and navigation apparatus 100 may preferably be made by packet transmission.

Arithmetic processing unit 14 in information center 10 executes the system control program 26 stored in memory 18 in response to receipt of the above-described data. The route search program 20 stored in memory 18 is executed by CPU 16 to start the route search operation. More particularly, the current vehicle position data and the destination data are picked out from the received data (step S12) and a particular destination is determined from the destination data (step S14). For example, in a case where the destination is input as a telephone number or an address, a particular destination is determined by reference to the destination specifying data 38 in database 30.

When a guidance-demanding route length (segment or segments) is specified in the received data ("Yes" at step S16), this is pieserved in memory 18 as route length data 27 and a drive route from the current vehicle position to the destination is searched and planned (at step S18). On the contrary, when no route data length is specified in the received data ("No" at S16), a predetermined initial value is preserved as the route length data 27 (step S22), followed by a drive route search operation at S18. The drive route search operation is made with reference to the road data 32 in database 30 which includes crossing data, node data. etc. The drive route search operation may be made, for example, in the manner disclosed in Japanese patent laid-open publication No. 1-173297 and 1-173298, for example, to determine a recommended drive route, which may be the shortest one from the current position to the destination. In this embodiment, a drive route from the current position to the destination is determined each time information center 10 receives a request from navigation apparatus 100. As described before, database 30 in information center 10 has the latest contents because they are updated with information obtained by external information collection unit 10. By carrying out the drive route search operation in response to each receipt of a request from navigation apparatus 100, it is be possible that navigation apparatus 100 always receive the most suitable drive route which may detour location of a traffic jam. road construction, and/or traffic accident, for example, and guidance data for providing guidance along the drive route.

Figure 4:
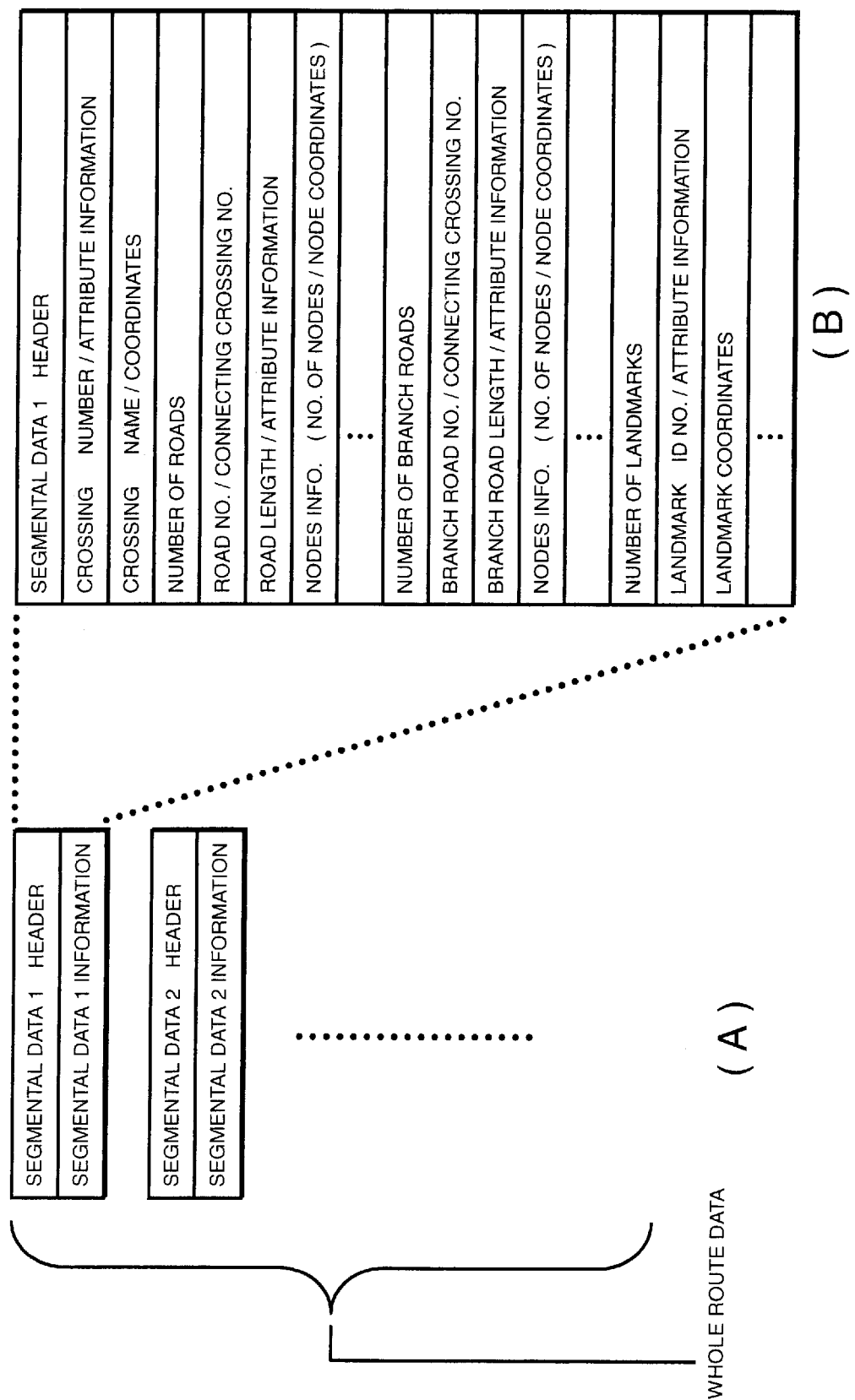
FIG. 4 is an explanatory view showing a manner of dividing the planned drive route. with an example of content of divided, segmental data.

Then, CPU 16 of arithmetic processing unit 14 executes the segmentation program stored in memory 18 to divide the searched drive route data into data segments (step S20). Each data segment is a guiding unit, which can be used independently in navigation apparatus 100 for guiding the user of the navigation apparatus from one end to the other of a segment of the guide route corresponding to the data segment. The data may be divided such that each data segment has a constant data size (of 1024 bytes, for example) or a constant route length (of 200 m, for example). As shown in FIG. 4 by way of example, the searched drive route is divided into a first drive route segment, a second drive route segment and succeeding drive route segments. Each drive route segment corresponds to one data segment. Each drive route segment includes a data header, crossing information, road information, node information, landmark information, etc. Segmentation of the drive route is advantageous because, if data communication between the information center and the navigation apparatus is interrupted, the user of the navigation apparatus can be guided along the drive route segments which have already been transmitted from the information center to the navigation apparatus before interruption of data communication. Another advantage is that data to be re-transmitted from the information center to the navigation apparatus after recovery of data communication therebetween, need not cover the whole drive route but only that part thereof which the navigation apparatus failed to receive. Each data segment is a unit of information decodable independently in the navigation apparatus. For example, using a prior art system, if a 10 km drive route data segment is prepared as a single file for transmission as a whole from the information center, the data can not be decoded in the navigation apparatus in the event of a failure of the communication link during transmission. In this case, the user of the navigation apparatus can not be guided over the entire 10 km drive route. On the contrary, in the present invention, because of the same drive route data is divided into several data segments, each data segment is usable in the navigation apparatus independently, and, in the event of such a failure, the navigation apparatus can start to guide the user, even if the navigation apparatus did not receive all the data segments. The navigation apparatus can then later get the unreceived data segments during guidance of the user after recovery of the communication link, and can complete the entire guidance to the destination.

Then, arithmetic processing unit 14 combines each succeeding drive route segments with the previously received segments, one by one (step 530), and calculates a total route length of an extended drive route which starts at the starting point of the preceding drive route segment(s) and terminates at the end of the added drive route segment (step 532). More specifically, the first and second drive route segments are combined with each other (step S30) and the total route length of the first and second drive route segments is calculated (at S32). Next, the third drive route segment is added by connection to the end of the second drive route segment (at S30) and the total route length of the first to the third drive route segments is calculated (at S32). These steps S30 and S32 are repeated until the total road length becomes equal to or exceeds the demanded guide route length confirmed at S16 or determined at S22.

When the total route data length of the combined drive route becomes equal to or exceeds the demanded guidance route length ("Yes" at S34), arithmetic processing unit 14 executes the communication judgment program 25 stored in memory 18 so that it predicts the vehicle position where navigation apparatus 100 mounted on the vehicle will send the next request for drive route guidance (S36). The predicted vehicle position must be on the drive route under control and may be determined at a point 200 m (for example) in advance of the terminus of the drive route.

Next, arithmetic processing unit 14 judges, by reference to the communication area data 36 in database 30, whether or not the predicted vehicle position and vicinity are in an area without availability of data communication ("incommunicable area") (step S38). The terminology "incommunicable area" means an area susceptible to trouble or difficulty in communication between the information center and the navigation apparatus when the latter is located therewithin. An area outside of any communication service area is one example of a "incommunicable area." A tunnel is another example of an "incommunicable area." An area where the communication link is apt to be busy or unstable may also be regarded as an "incommunicable area."

When it is judged that the predicted vehicle position from which the next request will be sent is within an "incommunicable area" ("Yes" at S38) another drive route segment is added to the already combined drive route (step S30) and communication availability judgment is carried out in a similar manner (S38). When, on the contrary, it is judged that the predicted vehicle position is within a communication area ("No" at S38), arithmetic processing unit 14 executes the guidance data search program 24 stored in memory 18 to search and extract the guidance data corresponding to the route length of the route guidance data to be transmitted to the vehicle, by reference to the guidance data 34 in database 30 (S39). The extracted guidance data 29 is stored in memory 18. The route guidance data segments obtained in the above-described manner are transmitted, together with a navigation apparatus ID to navigation apparatus 100 mounted on the vehicle through communication unit 12. A plurality of the route guidance data segments are transmitted in the order of distance to the current vehicle position, the closest one being transmitted first.

Figure 5:
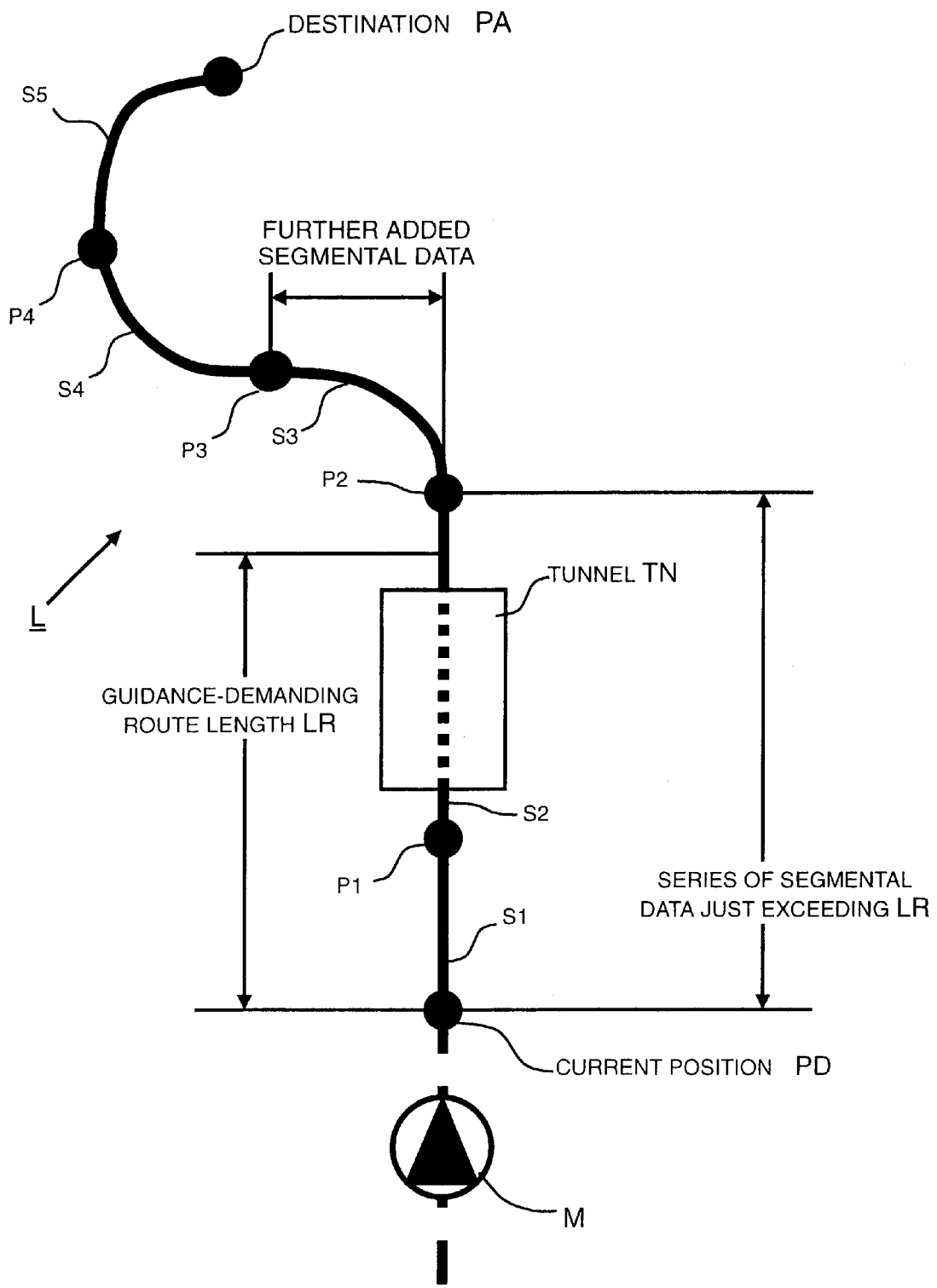
FIG. 5 is a diagram showing the relationship between a planned drive route and a plurality of route segments obtained by division of the planned drive route.

The above-described operation will become more clearly understood by reference to an example shown in FIG. 5 wherein a bold line L represents a drive route from the guidance start position PD to the destination PA, which is defined by the route guidance data transmitted from information center 10 at step S40 of the flowchart of FIGS. 2 and 3. The current vehicle position is shown by a symbol with a reference M. The drive route L consists of five route segments 51–55 with junctions P1–P4 As shown, the first route segment S1 is shorter than the demanded guidance route length LR but the total route length of the first and second segmental route segments S1 and S2 exceeds the route length LR. However, there is a tunnel TN near the end P2 of the second route segment S2, which would be within an "incommunicable area" so that the result of judgment at S38 is positive. Accordingly, the third route segment S3 is further added at S30. Since there is no "incommunicable area" around the end of the third route segment S3 ("No" at S38), the route guidance data is prepared at S39 for guiding the user of navigation apparatus 100 mounted on the vehicle from the start position PD to the end position P3 and is transmitted in a single transmission to navigation apparatus 100 at S40. In other words. navigation apparatus 100 receives the route guidance data comprising the first to the third route data segments S1–S3 in series.

Operation of the Vehicle Mounted Apparatus

Figure 6:
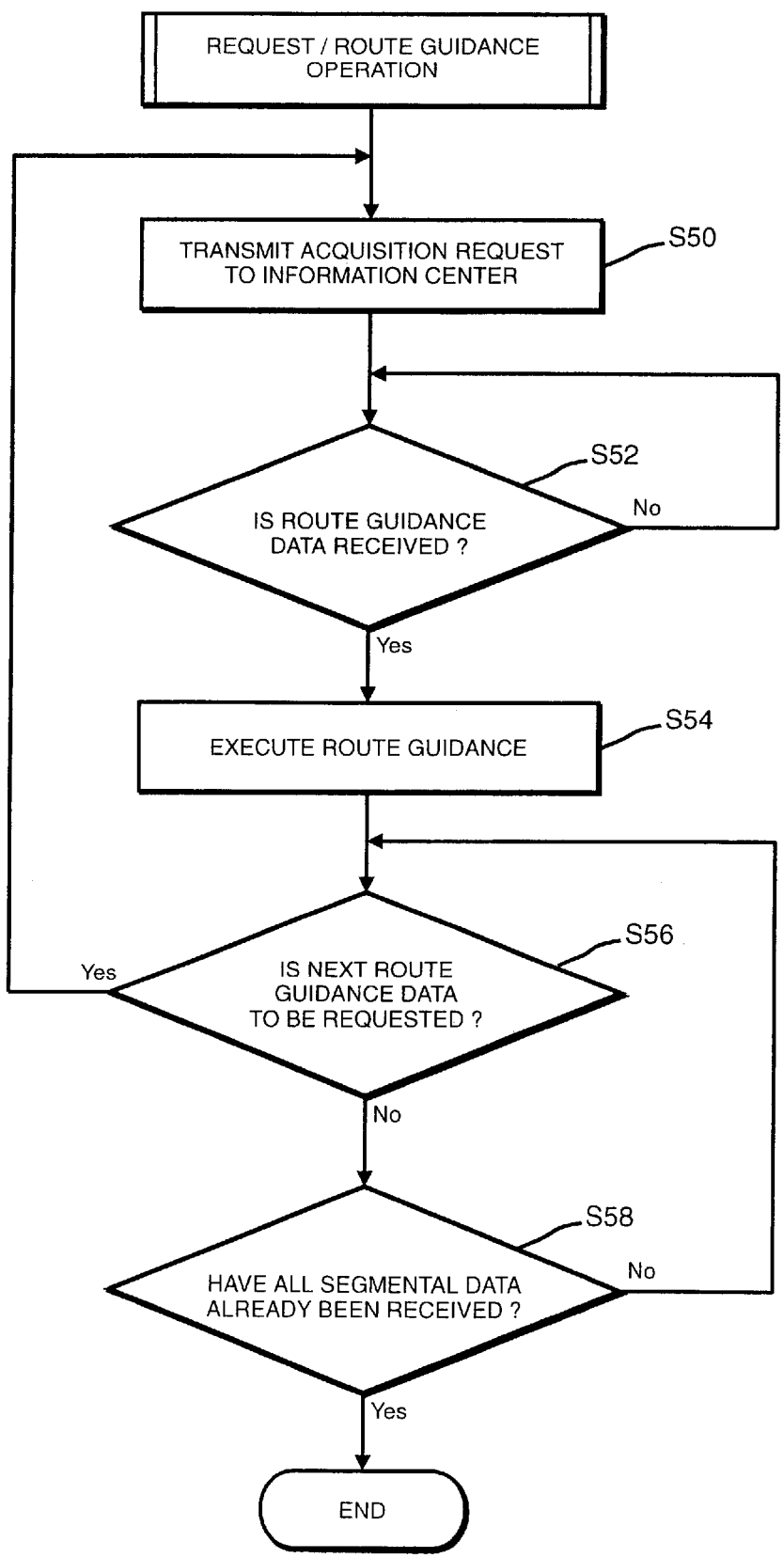
FIG. 6 is a flowchart showing a routine for requesting route guidance transmission and for providing route guidance, which routine is executed at the navigation apparatus mounted on the vehicle.

FIG. 6 is a flowchart of a routine for request transmission and route guidance executed at in the on-board vehicle navigation apparatus. Step S50 has already been described. When communication unit 108 receives the route guidance data from information center 10 ("Yes" in step S52) arithmetic processing unit 101 stores the received data in memory 102 and executes the route guidance program 150 stored in memory 102 to carry out the route guidance by utilizing the received route guidance data (step S54). More specifically, a route map and landmarks are represented on display 106 and a voice guidance message is output through speaker 107 for guiding the driver to turn right or left at a crossing, for example.

At the same time, arithmetic processing unit 101 confirms the current vehicle position detected by position sensor 104 and executes the data request program 152. When the current vehicle position reaches a point in advance of the terminal end of the received drive route by a predetermined distance (200 m, for example), the next route guidance data preparation and transmission is requested ("Yes" in step S56). Upon receipt of such a request from navigation apparatus 100, the information center again executes a series of operations as has been described with reference to the flowchart of FIGS. 2 and 3. When no request is made for the next route guidance data preparation and transmission ("No" at S56), it is then judged whether or not all of the route guidance data segments have been received (step S58). After receiving all of the data segments ("Yes" at S58), which means that the vehicle is prepared to be guided along the planned drive route to the final destination, the routine of the flow chart of FIG. 6 is finished.

Figure 7:
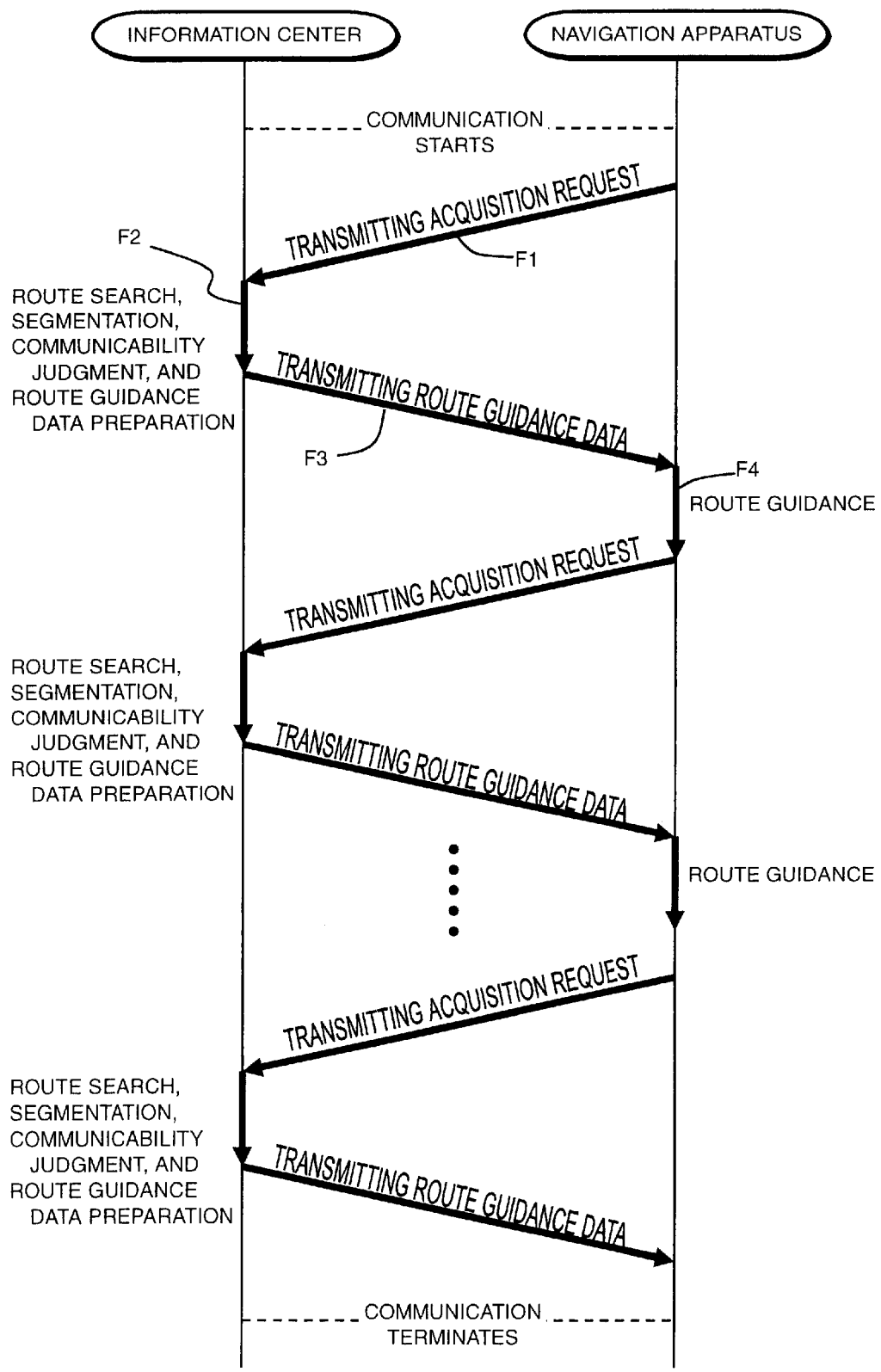
FIG. 7 illustrates an example of data communication between the information center and the navigation apparatus.

An example of data communication between information center 10 and navigation apparatus 100 is shown in FIG. 7. First, as shown by an arrow F1, the current vehicle position, the destination and the demanded guidance route length are transmitted from navigation apparatus 100 to information center 10. In response to receipt of this data, as shown by an arrow F2, information center 10 executes the route search, segmentation. communication judgment and route guidance data preparation in the manner described above with reference to the flowchart of FIGS. 2 and 3. Information center 10 then transmits the route guidance data to navigation apparatus 100, as shown by an arrow F3. Navigation apparatus 100 executes the actual route guidance operation in accordance with the received route guidance data, as shown by an arrow F1.

Once received route guidance data segments become unnecessary, they are deleted from the route guidance data 160. When the navigation apparatus requires continuous route guidance, navigation apparatus 100 again transmits the current vehicle position, the destination and the demanded guidance route length to information center, as shown by an arrow FS. Similar data communication is repeated until the user of the navigation apparatus is successfully guided to the destination.

In the foregoing embodiment, information center 10 searches for the next drive route each time the vehicle-mounted navigation apparatus reaches a remote position (or when the vehicle reaches a request transmitting position, for example). In a modified embodiment, information center 10 searches for the next drive route at a predetermined time interval. In any case, information center 10 searches for a most suitable drive route using the updated, latest data in database 30. The thus obtained drive route is divided into data segments for sequential transmission to navigation apparatus 100. Accordingly, in this modification, even if the vehicle remains at a standstill or moves at a very low speed, navigation apparatus 100 may receive the route guidance data from information center 10 at a predetermined time interval. For example, a serious traffic accident may occur at a point which is located on the current drive route, while the user of the navigation apparatus is taking a rest at a restaurant or a tearoom. Even in such a situation, the next route guidance data that navigation apparatus 100 receives during the rest should reflect the latest data and, therefore, show the route detour around the site of the traffic accident.

The foregoing embodiment provides the following advantages:

(1) The information center judges the communication condition or communicability when transmitting the route guidance data to the vehicle-mounted navigation apparatus. Accordingly, regardless of radio connection, the navigation apparatus surely receives the route guidance data from the information center.

(2) Since the route guidance data is divided into data segments which are sequentially transmitted to the vehicle-mounted navigation apparatus, even if communication between the information center and the vehicle-mounted navigation apparatus is interrupted for some reason, the user of the navigation apparatus can be guided by the data segments which have already been transmitted from the information center to the navigation apparatus before interruption of data communication. In re-transmission after recovery of communication, the information center need transmit only the remaining segments of the entire route guidance data.

(3) The information center searches and prepares the route guidance data in response to each receipt of a request from the navigation apparatus, utilizing an updatable database. Accordingly, the user of the navigation apparatus may always be guided along a most suitable drive route which reflects the latest road and traffic information.

(4) The route guidance data is prepared in response to the demanded guidance route length which may be adjusted depending on the storage capacity of the memory in the navigation apparatus.

(5) Since a drive route from the current vehicle position to the destination is searched each time a request is received from the vehicle-mounted navigation apparatus, even when the vehicle has strayed from the planned drive route, the next route guidance data prepared by the information center will provide suitable guidance to the navigation apparatus from the current off-route position to a position on the planned drive route. The user of the navigation apparatus may easily and quickly return to the planned guide route by execution of a route guidance program utilizing such route guidance data.

The foregoing first embodiment allows for a number of variations and modifications including the following:

(1) Instead of sending the destination data each time any data is transmitted from the navigation apparatus to the information center, the destination included in the first data transmission may be stored in the information center. This will reduce the time required for data transmission from the navigation apparatus to the information center, as well as omit the repeated determination of destination by the information center.

(2) The demanded guidance route length may be determined in accordance with the storage capacity of the memory storing the route guidance data in the navigation apparatus. The demanded guidance route length may have identical or different values in the various requests for gudance. Further, instead of lengthening the route length when there is no communication between the information center and the navigation apparatus, a predetermined point where the information center transmits the route guidance data may be changed. For example, when there is no communication at a point 200 m in advance of the terminal end of the drive route, the navigation apparatus may send a request to the infoimation center at a point 400 m in advance of the terminal end of the drive route.

(3) The number of data segments in the foregoing description is only an example and may vary upon demand.

(4) In the foregoing description, a drive route from the current vehicle position to the destination is searched each time a request is received from the navigation apparatus. Alternatively. the searched drive route may extend from the terminal end of the previously transmitted drive route to the destination.

(5) While the present invention is described as applied to a vehicle-mounted navigation apparatus in the foregoing description, it is also applicable to various other mobile units including a portable mobile terminal, personal computer, laptop computer, personal digital assistant (PDA), cellular phone and pager, each adapted to provide the above-described functions.

A second embodiment of the present invention will now be described in detail hereinbelow.

In the foregoing embodiment wherein the route guidance data segments are transmitted from the information center to the navigation apparatus mounted on the vehicle, in some instances the navigation apparatus will fail to receive the data. Such a failure may occur, for example. when the vehicle is running in an an area where no data communication is available ("incommunicable area"), when a great number of requests are transmitted from other navigation apparatuses to the information center at substantially the same time, and when the system of the information center has broken down. In such instances, the navigation apparatus can not guide the user of the navigation apparatus to the destination. The second embodiment, therefore, has as its object provision of a system capable of guiding the user along a recommended drive route even if the navigation apparatus fails to receive the route guidance data segments from the information center.

The information center in this embodiment may have the same arrangement as that of the information center 10 in the above-described first embodiment. The information center stores the road data, such as road network data, which may be used to search a drive route for guiding the user to the destination.

The navigation apparatus in this embodiment also stores the road data such as road network data for use in route searching operation, same as in the information center. Accordingly, in this embodiment, the navigation apparatus has a storage medium such as CD-ROM and DVD-ROM for storing the road data. The road data may be stored in memory 102, in which case no separate storage medium is required.

The navigation apparatus makes communication with the information center, through a radio communication unit. Usually, the information center prepares the route guidance data in reference to road data 32 in database 30, which is transmitted to the navigation apparatus so that the user of the navigation apparatus is guided to the destination.

Figure 8:
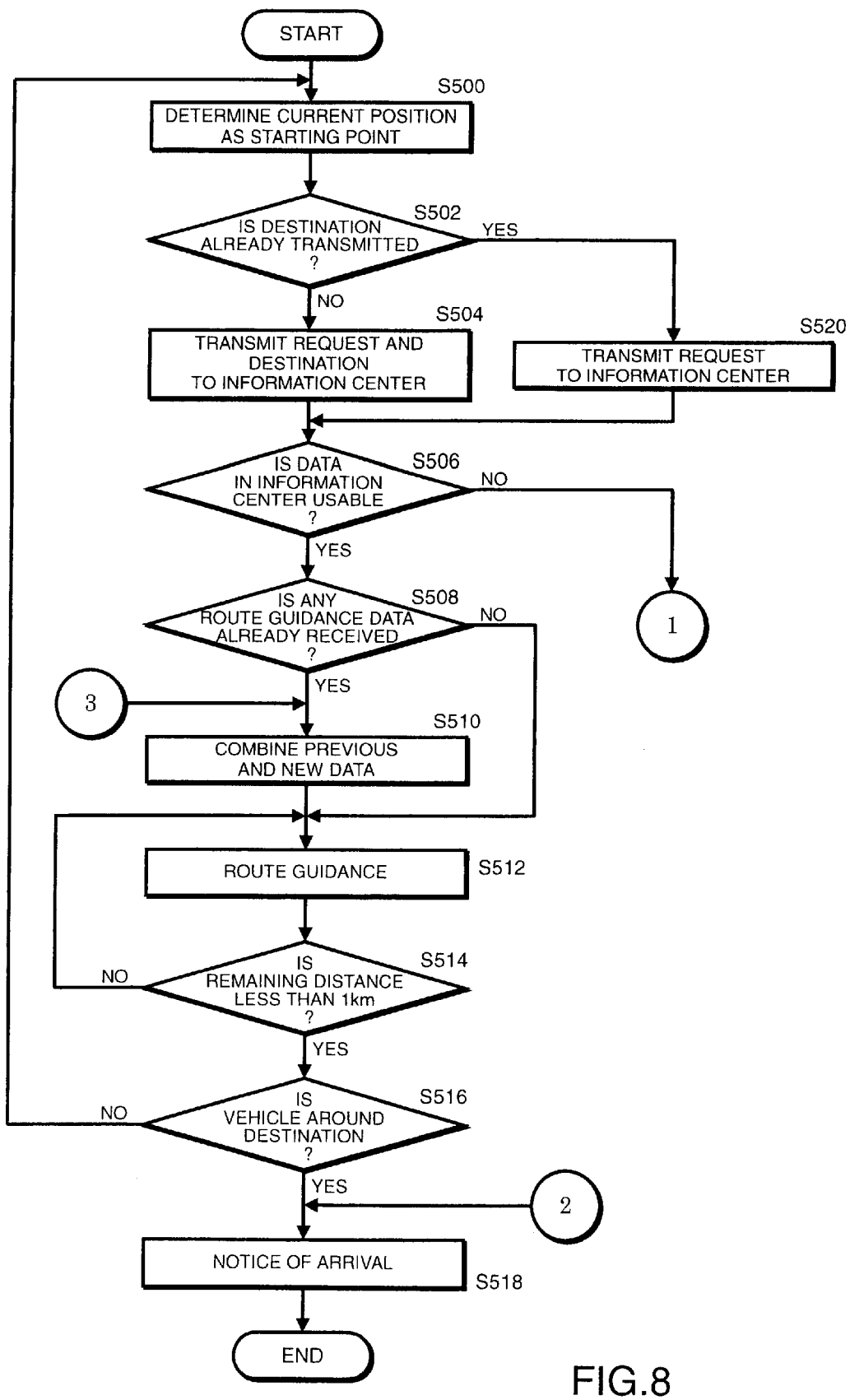
FIGS. 8 and 9 show a flowchart of a routine executed at the navigation apparatus when road data stored in the information center is unavailable to the navigation apparatus.
Figure 9:
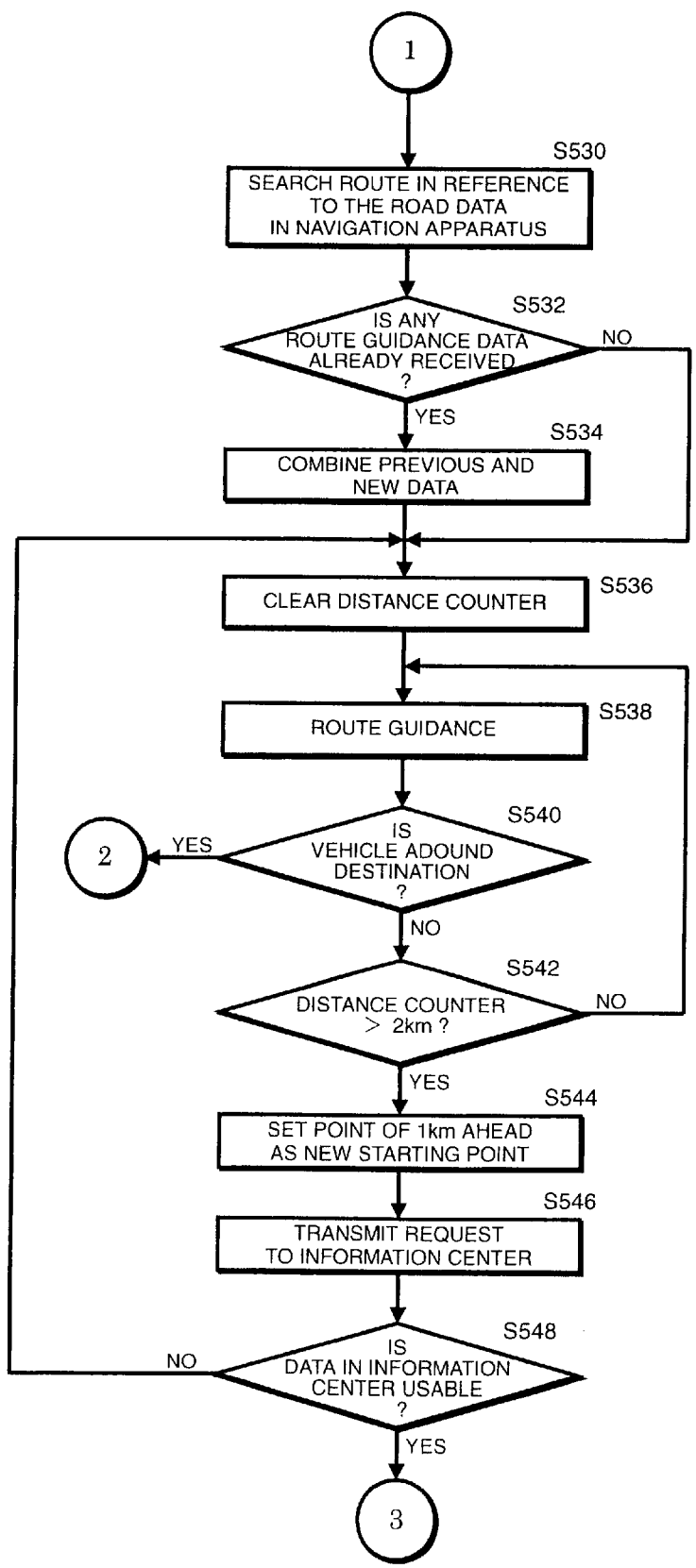

FIGS. 8 and 9 show a flowchart of operation executed by the navigation apparatus in the system of this embodiment.

The flowchart of FIG. 8 is executed in response to input by the user to designate a destination and operation of a start switch to generate a route guidance request. The start switch may be mounted directly on a panel of the navigation apparatus, or mounted to a remote control device.

When the start switch is turned on by the user, the current vehicle position is determined as a starting point (at a step S500). At this stage, no destination has been transmitted to the information center (No at a step S502). Accordingly, a destination inputted by the user, as well as the starting point determined at S500, are transmitted to the information center so as to request preparation and transmission of the segmental route guidance data from the starting point to the destination (at a step S504). A destination may be designated by inputting a telephone number or address indicative. When the user inputs a telephone number indicative of any particular location, the inputted telephone number is transmitted to the information center (at S504). The information center reads out said location corresponding to said telephone number from the destination data 38 in database 30 and determines said location as a destination the user of the navigation apparatus wishes to go. The information center then searches an optimum drive route from the starting point to the destination.

When it is detected that the road data 32 in database 30 can be used by the information center in actual route guidance (Yes at a step S506), the navigation apparatus receives, through the communication unit 108, the route guidance data prepared by the information center in reference. to the road data 32 in database 30, so that the user of the navigation apparatus can be guided to the destination by this route guidance data prepared by and transmitted from the information center.

Means for measuring a field intensity of a radio wave at the current vehicle position may be mounted on the navigation apparatus. When a field intensity measured by this means exceeds a predetermined threshold level, it may be judged that the road data 32 in database 30 is usable (Yes at S506).

In another example of detection at S506, data usability may be affirmed when the navigation apparatus successfully receives the route guidance data from the information center within a predetermined period from transmission of the request at S504. Safe receipt of the route guidance data from the information center may be confirmed when the navigation apparatus receives a notification of completion of transmission from the information center.

When receiving the route guidance data from the information center (Yes at S506), further steps S508–S516 are executed.

After executing steps S508–S516, in a case where the user doesn't reach the destination yet (No at S516), the navigation apparatus repeats steps from S500. When the navigation apparatus requests following route guidance data, the navigation apparatus sends a request only with current vehicle position data as a new starting point because the navigation apparatus has already sent the destination data at the previous request (Yes at S502, S520).

On the contrary, when a field intensity measured by the field intensity measuring means is below a predetermined threshold level, or when transmission of the route guidance data from the information center is not completed within a predetermined period from transmission of the request, it is judged that the road data 32 in database 30 can not be used for route guidance (No at S506).

When the vehicle is running in an incommunicable area, the field intensity would not reach the predetermined threshold level. When a great number of the requests are transmitted from other navigation apparatuses to the information center at substantially the same time, or when the system of the information center is broken down, transmission of the route guidance data from the information center would not be completed within a predetermined period from transmission of the request.

When it is judged that the road data 32 in database 30 can not be used for route guidance (No at S506), the user of the navigation apparatus is guided to the destination by utilizing the road data stored in the navigation apparatus. The navigation apparatus searches and plans a drive route to the destination and guides the user along the planned drive route to the destination.

More particularly, the navigation apparatus searches a drive route from the starting point (current vehicle position) to the destination in reference to the road data stored in the storage medium in the navigation apparatus (at a step S530). The starting point has been determined at S500. The destination may be one which has been inputted by the user.

When some route guidance data acquired from the information center has already been stored in data storage area 102B (Yes at a step S532), this data is combined with the drive route data searched at S530 to determine a drive route (at a step S534). Then, the navigation apparatus resets a drive distance counter (at a step S536) and executes route guidance (at a step S538).

The navigation apparatus may have already received several times the route guidance data from the information center, while the vehicle is running over a considerable distance from the starting position, before being judged that database 30 is not usable. The user is being guided by the most recently received route guidance data. In such case, judgment at S532 produces an affirmative result so that the route guidance data now in operation is combined with the drive route data which has been determined at S530 to determine the drive route (at S534).

On the contrary, when no route guidance data prepared by the information center is stored in data storage area 102B (No at S532), the navigation apparatus resets a drive distance counter (at a step S536) and executes route guidance by which the user is guided along the drive route which has been determined at S530 (at S538).

As described above, in the system of the second embodiment, the navigation apparatus has a memory storing the road data to be used in route searching operation, apart from the same kind of data 32 stored in database 30 in the information center. When it is detected that the road data 32 in database 30 can not be used for route guidance (No at S506), the user is guided to the destination by utilizing the road data stored in the navigation apparatus. Consequently, the route guidance to the user may continue, without interruption, even if the navigation apparatus is incommunicable with the information center which makes impossible to use the road data stored in the information center. Incommunicability between the information and the navigation apparatus may occur when the vehicle is running in an incommunicable area, when a great number of the requests are transmitted from other navigation apparatuses to the information center at substantially the same time, or when the system of the information center is broken down.

While the user is being guided to the destination by utilizing the road data stored in the memory in the navigation apparatus, the de navigation apparatus sends a request to transmit the segmental route guidance data (at a step S546) at an interval of a predetermined drive distance (Yes at a step S542). If any cause of disusability of the road data 32 stored in the information center has been resolved at the time of transmitting a request to the information center (Yes at a step S548), the information center restarts the operation in response to receipt of the request to search a drive route in reference to the road data 32 stored therein. When the vehicle runs into a communicable area, when the number of the requests transmitted from other navigation apparatuses is reduced, or when the system of the information center has been recovered, disusability of the road data 32 will be resolved.

Once the road data 32 in the information center becomes usable again, the route guidance data prepared by the information center is automatically transmitted to the navigation apparatus. As described in connection with the first embodiment, the route guidance data prepared by the information center provides a drive route which may detour a point of traffic jam, traffic accident and road construction, for example, because the road data 32 is updated by information from the external information collection unit 40. The route guidance data prepared by the information center comprises one or more of segmental data as described before in reference to FIG. 5.

When the road data 32 in the information center is usable (Yes at S548), the segmental route guidance data transmitted from the information center is combined with the route guidance data prepared by the navigation apparatus in reference to the road data stored therein to determined a drive route (at S510), along which the user is guided to the destination (at S512).

Usability of the road data 32 at S548 may be judged substantially the same manner as described before in connection with judgment at S506.

Again, means for measuring a field intensity of a radio wave at the current vehicle position may be mounted on the navigation apparatus. When the field intensity measured by this means exceeds a predetermined threshold level, it may be judged that the road data 32 is usable (Yes at S548). In another example of detection at S548, data usability may be confirmed when the navigation apparatus successfully receives the segmental route guidance data from the information center within a predetermined period from transmission of the request at S546. Safe receipt of the segmental route guidance data from the information center may be confirmed when the navigation apparatus receives a notification of completion of transmission from the information center.

On the contrary, when the field intensity measured by the field intensity measuring means is below the predetermined threshold level, or when transmission of the segmental route guidance data from the information center is not completed within the predetermined period from transmission of the request, it is judged that the road data 32 can not be used for route guidance (No at S548).

When the road data 32 in the information center is still not usable (No at S548), the navigation apparatus sends again a request to transmit the segmental route guidance data (at S546) at an interval of a predetermined drive distance (Yes at S542) until the user reaches to the destination (Yes at a step S540).

Although in the foregoing description the request is sent to the information center at a predetermined drive distance (of 2 km, for example), it may be sent at a predetermined time interval (of 10 minutes, for example).

Instead of above-described periodical confirmation for usability of road data 32 in the information center (S536–S548), the navigation apparatus may send a request automatically just after confirming usability of road data 32. The route guidance data thus prepared by the information center is transmitted to the navigation apparatus, so that S510 and the succeeding steps are executed.

Usually, the vehicle runs in a distance of the order of 1 km between sending the request to the information center and receiving the route guidance data from the information center. Accordingly, a point of 1 km ahead of the current vehicle position is determined as the starting point (at a step S544).

The system according to a third embodiment of the present invention will be described in detail hereinbelow.

In the above-described second embodiment, when the road data in the information center is found to be disusable (No at S506), the user of the navigation apparatus is guided to the destination along a drive route which is searched in reference to the road data stored in the memory in the navigation apparatus (at S530, S534 and S538).

Normally, the destination is inputted by the user (at S504). When the user inputs a telephone number indicative of a destination, this is transmitted to the information center.

The information center has the database 30 storing the destination data 38 in which almost every location of institution or place is correlated with its telephone number and/or address. Accordingly, in reference to the inputted telephone number, a corresponding location of institution or place may readily be read out from the destination data 38 and is determined as a destination that the user wishes to go.

The user may design ate a destination by inputting its address. Likewise, the information center receives the inputted information (address) and reads out a corresponding location of institution or place from the destination data 38, which is determined as a destination. Data for representing a picture by which the telephone number and/or the address is inputted may be stored in the memory in the navigation apparatus, or obtained by transmission from the information center.

However, when the navigation apparatus is incommunicable with the information center, the information center can not receive the inputted data and, therefore, nor determine a corresponding destination in reference to the destination data 38 stored therein. Accordingly, no route searching operation may be executed. Such incommunicable situation may occur, for example, when the vehicle is running in an incommunicable area, when a great number of the requests are transmitted from other navigation apparatuses to the information center at substantially the same time, and when the system of the information center is broken down.

To cope with this problem, in accordance with the third embodiment of the present invention, apart from the destination data 38 stored in the information center, second destination data is stored in the navigation apparatus. In the second destination data, almost every location of institution or place is correlated with its telephone number and/or address, as in the first destination data 38 in the information center.

The information center in this embodiment may have the same arrangement as that of the information center 10 in the first embodiment. The information center stores the road data, such as road network data, which may be used to search a drive route for guiding the user to the destination. The information center also stores the destination data 38 in which almost every location of institution or place is correlated with its telephone number and/or address.

The navigation apparatus makes communication with the information center, through a radio communication unit 108. The telephone number and/or address inputted by the user through an input device 105 is transmitted to the information center. The information center thus determines a specific destination which corresponds to the inputted telephone number and/or address in reference to the destination data 38, so that the user may be guided to the destination.

In this embodiment, the navigation apparatus detects whether or not the destination data 38 in the information center can be used. When it is detected that the destination data 38 is not usable, the navigation apparatus operates to determine a destination in reference to the second destination data stored in the memory in the navigation apparatus.

For example, means for measuring a field intensity of a radio wave at the current vehicle position is mounted on the navigation apparatus. When the field intensity measured by this means exceeds a predetermined threshold level, it may be judged that the destination data 38 in the information center is usable. On the contrary, when the measured field intensity is below the predetermined threshold level, this would means that the destination data 38 is not usable.

As above described, in the third embodiment, apart from the destination data 38 stored in the information center, second destination data is stored in the navigation apparatus. In the second destination data, almost every location of institution or place is correlated with its telephone number and/or address, same as in the first destination data 38 in the information center. When it is detected that the destination data 38 is not usable, a destination can be determined in reference to the second destination data stored in the memory in the navigation apparatus. Consequently, even if the navigation apparatus is incommunicable with the information center due to being in an incommunicable area, an overcrowded communication with the information center, a system breakdown in the information center, for example, a destination can be determined, which enables the user to be guided to the destination.

The system according to a fourth embodiment of the present invention will be described in detail hereinbelow.

In the above-described second embodiment, when the road data in the information center is found to be usable, it is used to guide the user of the navigation apparatus mounted on the vehicle to the destination, whereas when it is found to be disusable, another road data stored in the memory in the navigation apparatus is used to guide the user to the destination.

In the fourth embodiment, the navigation apparatus has the same arrangement as that of the second embodiment, except that it further comprises means for requesting the information center to prepare and transmit the segmental route guidance data when the vehicle has been strayed from the drive route which has been determined in reference to the road data stored in the information center or in the navigation apparatus.

The information center in this embodiment may have the same arrangement as that of the information center 10 in the second embodiment.

Figure 10:
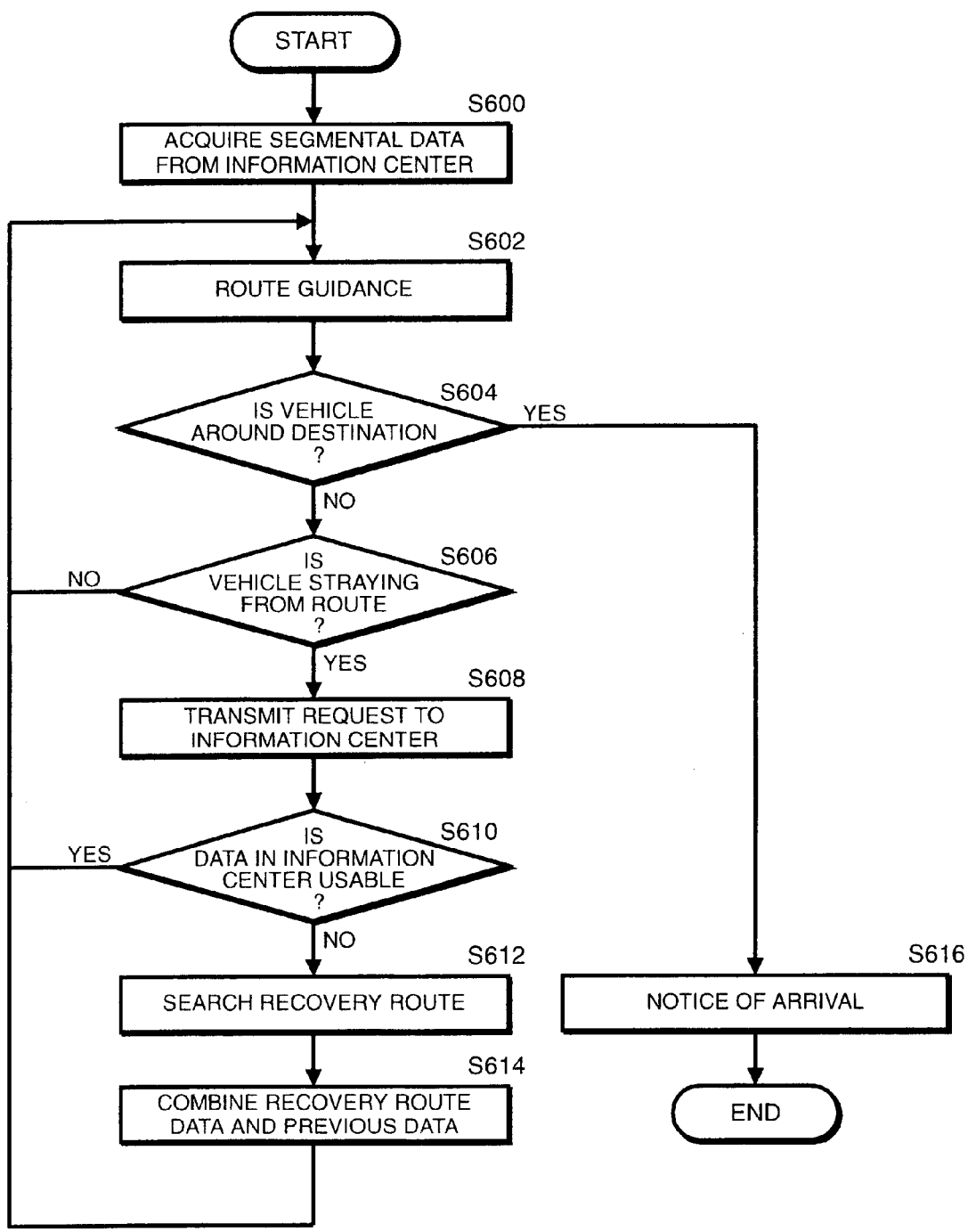
FIG. 10 is a flowchart of a routine executed at the navigation apparatus when the vehicle has strayed from the planned drive route.

FIG. 10 is a flowchart illustrating operation executed by the navigation apparatus when the vehicle has been strayed from the drive route which has been determined by the information center from the road data stored therein.

The operation begins with a step S600 in which the navigation apparatus receives the segmental route guidance data from the information center. The user of the navigation apparatus mounted on the vehicle is guided to the destination by the received segmental route guidance data (at a step S602). When it is judged that the vehicle has reached around the destination (Yes at a step S604), a voice message such as "You are around the destination. Guidance will be finished." is outputted through the speaker 107 with or without an appropriate image on the display 106 (at a step S616), and the operation terminates. It may be judged that the vehicle has reached around the destination, when a distance between the current vehicle position and the destination becomes shorter than a threshold value.

When it is not judged that the vehicle has reached around the destination (No at a step S604), it is then judged whether or not the vehicle has strayed from the drive route along which the user is being guided to the destination (at a step S606).

When it is not judged that the vehicle has strayed from the drive route (No at S606), guidance at S602 and judgment at S604 are repeated.

When it is judged that the vehicle has strayed from the drive route (Yes at S606), in a similar manner as at S520 of the flowchart of FIG. 8 in the second embodiment, the segmental route acquisition request, together with the current vehicle position (as the starting point), are transmitted to the information center (at a step S608).

In response to receipt of the segmental route acquisition request from the navigation apparatus, usability of the road data 32 in the information center is judged (at a step S610). When it is detected that the road data 32 in the information center can be used (Yes at S610), the information center prepares new route guidance data and transmits it to the navigation apparatus. The navigation apparatus guides the user along a drive route which is determined by the received route guidance data in combination with the previous route guidance data (at S602).

When it is detected the road data 32 in the information center is not usable (No at S610), at a step S612, the navigation apparatus searches, in reference to the road data stored in the own memory, a recovery route from the current vehicle position to a position on the prearranged drive route along which the user should be guided to the destination at S602. The recovery route may be one providing the shortest trip from the current vehicle position to the position on the prearranged drive route.

A new drive route is determined by combining the searched recovery route data with the prearranged route data (at a step S614), and the navigation apparatus guides the user along the new drive route (at S602).

As described above, in the fourth embodiment, the road data is stored not only in a memory provided in the information center but also in another memory provided in the navigation apparatus, and the navigation apparatus is provided with means for requesting the information center to prepare and transmit the segmental route guidance data when the vehicle has been strayed from the drive route which has been determined in reference to the road data stored in the information center or in the navigation apparatus.

In a case where the road data in the information center is not usable (No at S610) in case of driving in an incommunicable area, an overcrowded communication with the information center, a system breakdown in the information center, for example, the user is guided to the destination using the road data stored in the memory in the navigation apparatus.

Accordingly, in a case where the vehicle has been strayed from the prearranged drive route, and even in a case where the navigation apparatus is not communicable with the information center due to being in an incommunicable area, an overcrowded communication with the information center, a system breakdown in the information center, for example, the user can be guided to the destination using the road data stored in the memory in the navigation apparatus.

The system according to a fifth embodiment of the present invention will be described in detail hereinbelow.

As described before in connection with the third embodiment, location of any institution or place to be designated as a destination is correlated with its telephone number and/or address in the destination data which is stored in the information center and also in the navigation apparatus. However, the memory in the navigation apparatus has a storage capacity much smaller than the memory in the information center. Therefore, it may occur that a destination which corresponds to the inputted telephone number or address is not stored in the memory in the navigation apparatus.

In a case where the navigation apparatus is communicable with the information center, the inputted telephone number of address is transmitted to the information center so that the information center may identify a corresponding destination in reference to the destination data, having much greater data volume.

However, if communication between the vehicle and the information center becomes interrupted or out of order for some reason so that the destination data in the information center can not be used, it is not possible to determine a accurate destination corresponding to the telephone number of address inputted by the user, when such corresponding destination is not stored in the memory in the navigation apparatus.

Accordingly, in the fifth embodiment, when it is detected that the destination data in the information center is not usable and when a destination corresponding to the inputted telephone number or address is not found in the destination data in the memory in the navigation apparatus, the user is guided to an area which may be identified by a part of the inputted telephone number (area code, for example) or a part of the inputted address (name of country, township, city, town, village, street, avenue, zip code, for example).

By way of example, when it is detected that the destination data in the information center is not usable and when a destination is designated by inputting its ten-digit telephone number of "123-456-xxxx" which is unfortunately not found in the destination data in the memory in the navigation apparatus, the user is guided to an area which corresponds to the first six-digit number of "123-456". In another example, when it is detected that the destination data in the information center is not usable and when a destination is designated by inputting its address of "xxxx, Alexandria, Va." which is unfortunately not found in the destination data in the memory in the navigation apparatus, the user is guided to the city of Alexandria, Va.

In preferable application of this embodiment, the memory device in the navigation apparatus stores a plurality of locations each representative of an area which is identified by a part of the inputted telephone number or address. When some telephone number or address is inputted by the user, the navigation apparatus refers to the own destination data to read out a representative location corresponding to a part of the inputted information, so that the user may be guided to the representative location. Such guidance may not always meet the user's demand and will hereinbelow referred to as provisional guidance.

When the vehicle enters a communicable area, for example, during execution of the provisional guidance, it is detected that the destination data in the information center becomes again usable. In this case, the entire data of the inputted telephone number or address and the current vehicle position are automatically transmitted to the information center (at S546, S536–S548 of the flowchart of FIG. 9). Then, in the information center, a new route guidance data that leads the user to the accurate location of the destination is produced and transmitted. After receiving the route guidance data from the information center (Yes at S548), the user is guided to the destination by the received route guidance data (at S510 of the flowchart of FIG. 8). Such operation is carried out in substantially the same manner as in the second embodiment.

Figure 11:
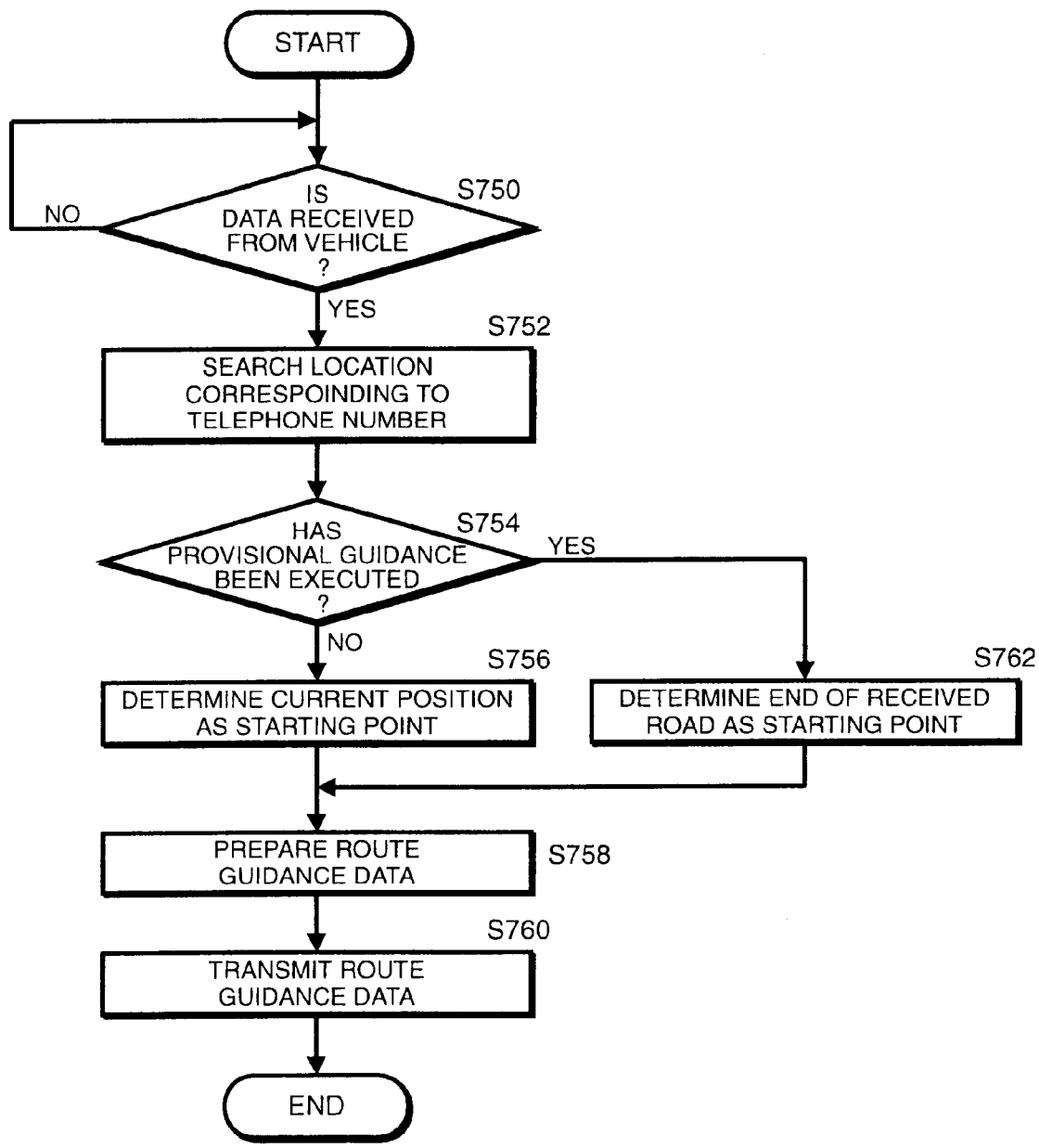
FIG. 11 is a flowchart of a routine executed at the information center when receiving data indicating a telephone number and/or an address from the navigation apparatus.

FIG. 11 is a flowchart illustrating operation executed by the information center when receiving the segmental route acquisition request from the navigation apparatus (at S546). Again, the segmental route acquisition request is automatically transmitted from the navigation apparatus when the vehicle enters a communicable area, for example, during execution of the provisional guidance.

When the information center receives the segmental route data acquisition request, as well as the inputted telephone number specifying a destination the user wishes to go, the current vehicle position, a flag indicating execution of the provisional guidance, an ID of a road on which the vehicle locates, etc. (Yes at a step S750), it searches a location corresponding to the entire telephone number in reference to the destination data 38 (at a step S752).

The information center judges if the provisional guidance is being executed in reference to the flag (at a step S754). If the provisional guidance is not executed at this time (No at S754), it determines the current vehicle position as a starting point (at a step S756) and searches a route from this starting point to the location found at S752 and prepare the segmental route guidance data (at a step S758), which is transmitted to the navigation apparatus in response to the segmental route data acquisition request (at a step S760). In preferable application, when the information center successfully finds a accurate location which corresponds to the entire telephone number inputted by the user, it then searches detailed information regarding the location, which is also transmitted to the navigation apparatus. In another preferred application, when the inputted telephone number designates a theater, the information center estimates the arrival time on the user at the theater based on the traffic jam or accident information so that film programs which will start after arrival are noticed to the user of the navigation apparatus. An example of the film programs is "A new film entitled "xxx" is now showing at the ABC theater. The film begins at 11:30, 13:55, 16:10 and 18:45. You will be in time for the second show." When the inputted telephone number designates a supermarket, for another example, its business hours may be transmitted to the navigation apparatus. In this case, the user of the navigation apparatus may be given a notice of "The supermarket you want to go is open until 10 p.m.", "The supermarket is closed today.", "The supermarket will be closed at the estimated time of arrival. Another neighbor supermarket is still open.", for example.

Returning to the step S754, when the provisional guidance has been executed (Yes at S754), the terminal end of the vehicle-locating road, which is specified by ID number transmitted from the navigation apparatus, is set as a starting point (at a step S762), and a drive route from this starting point to the location confirmed at S752 is searched out to prepare the segmental route guidance data (at S758), which is transmitted to the navigation apparatus (at S766). It is to be noted that the foregoing operation is similarly applicable when the user designates a destination by inputting its address.

As described above, in accordance with this embodiment, when it is detected that the destination data in the information center is not usable and when a destination corresponding to the inputted telephone number or address is not found in the destination data in the memory in the navigation apparatus, the user is guided to an area which may be identified by a part of the inputted telephone number (area code, for example) or a part of the inputted address (name of country, township, city, town, village, street, avenue, zip code, for example).

Accordingly, even if the navigation apparatus is not communicable with the information center due to being in an incommunicable area, an overcrowded communication with the information center, a system breakdown in the information center, for example, which makes it impossible to use the destination data stored in the information center, and even when a destination corresponding to the inputted telephone number or address is not found in the destination data in the memory in the navigation apparatus, the user may be guided to the destination where the user wants to go.

The system according to a sixth embodiment of the present invention will be described in detail hereinbelow.

In the first embodiment, the road data stored in the memory in the information center is used to prepare the route guidance data, which is transmitted to the navigation apparatus to guide the user to the destination. When the navigation apparatus is in an incommunicable area, however, the navigation apparatus can not use the road data stored in the information center in actual guidance.

Accordingly, in this embodiment, when it is detected that the navigation apparatus is in an incommunicable area, another road data and communicable area data, both stored in a memory in the navigation apparatus, are used to search a route, along which the user is guided to enter a communicable area. Particularly, when a field intensity of a radio wave measured by measurement means in the navigation apparatus is below a threshold level, it may be detected that the navigation apparatus is in an incommunicable area.

The communicable area data is the data to specify a plurality of communicable areas where the navigation apparatus can communicate with the information center. In modification, the communicable area data may specify incommunicable areas where the navigation apparatus can not or hardly communicate with the information center. The communicable area data is stored in the memory in the navigation apparatus as a combination of plural coordinates P1–P6 shown by way of example in FIG. 12. In this example, an area surrounded by segments P1–P2, P2–P3, P3–P4, P4–P5, P5–P6 and P6–P1 indicates an incommunicable area.

Figure 12:
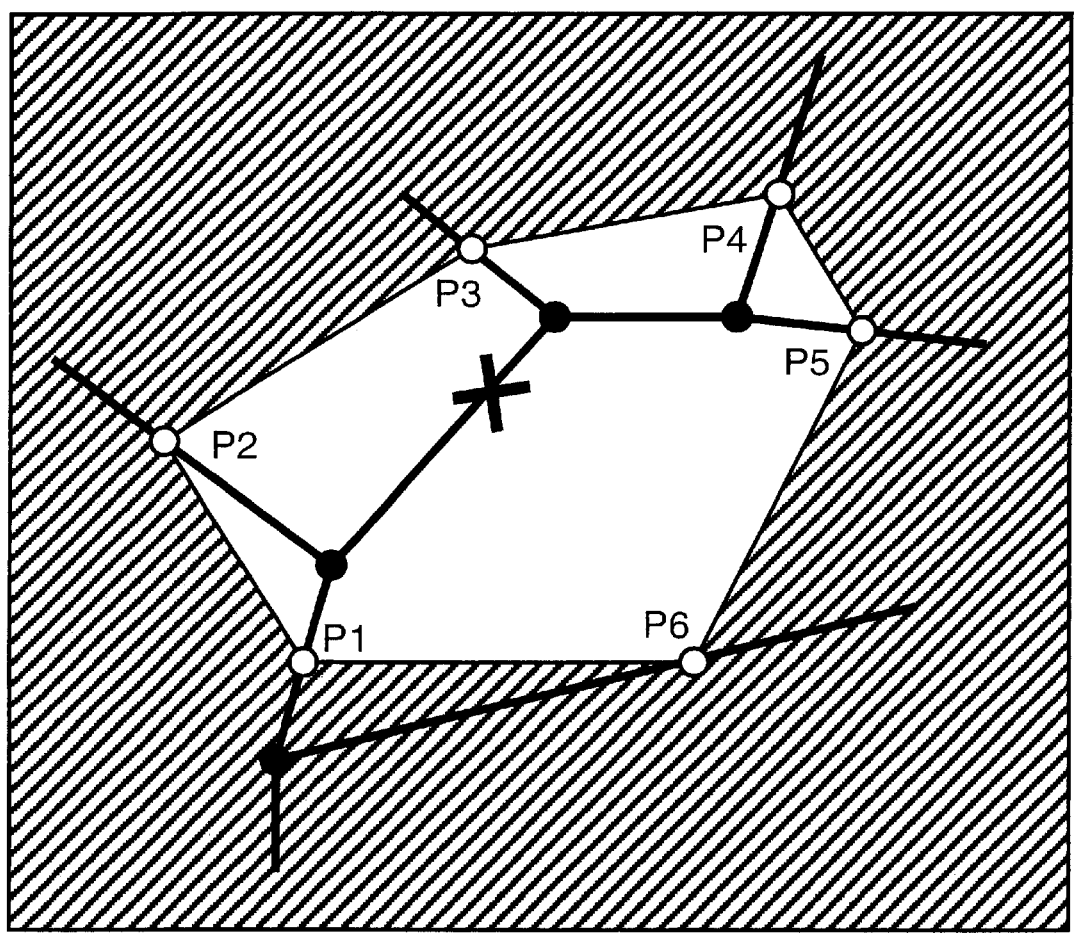
FIG. 12 is a diagram showing data stored in a memory of the navigation apparatus, which used to identify an area in which communication with the information center is not available.

When the current vehicle position is represented by a symbol "X" in FIG. 12, meaning that the vehicle which mounts the navigation apparatus is in an incommunicable area at this time, distances from the current vehicle position "X" to the respective points P1–P6 are calculated to find a route having the shortest distance in reference to the road network data stored in the memory in the navigation apparatus. In the example of FIG. 12, a route from the current position "X" to the nearest point P3 is searched so that the user on the vehicle is guided to the point P3.

When the vehicle reaches the point P3, it will be detected that the vehicle enters a communicable area. When so detected, the navigation apparatus automatically transmits a request for route guidance data and receives the route guidance data to and from the information center, as in usual operation. As described before in connection with the fifth embodiment, when the inputted destination has detailed information such as film programs (for theaters) and business hours (for supermarket), such detailed information may also be transmitted to the navigation apparatus, as well as the route guidance data. When the navigation apparatus receives the detailed information of the destination, it is noticed to the user through the display 106 and/or speaker 107.

Except the abode-scribed, the navigation apparatus and the information center in this embodiment may have the same arrangement in the third embodiment.

As described above, in accordance with the sixth embodiment, when it is detected that the navigation apparatus is in an incommunicable area based on, for example, a field intensity of a radio wave at the current vehicle position, another road data and communicable area data, both stored in a memory in the navigation apparatus, are used to search a route, along which the user on the vehicle is guided to enter a communicable area.

Consequently, in a communication navigation system wherein the user of the navigation apparatus mounted on the vehicle is usually guided to the destination by the route guidance data prepared by the information center in reference to the road data stored therein and transmitted therefrom to the navigation apparatus, even if it becomes impossible to use the route guidance data prepared by the information center, which may be caused while the navigation apparatus is in an incommunicable area, the user can still be guided to a communicable area by utilizing the route searching stored in the memory in the navigation apparatus. After entering the communicable area, the navigation apparatus becomes again communicable with the information center so that it acquires a new route guidance data which may detour a point of traffic jam, accident and construction in view of the latest data stored in an updatable memory in the information center.

The system according to a seventh embodiment of the present invention will be described in detail hereinbelow. This embodiment may be understood as a modification of the third embodiment. The navigation apparatus and the information center in this embodiment may be the same as in the third embodiment.

Input of the entire information (telephone number or address) indicative of a destination is a precondition in the third embodiment. For example, when the information center receives an ten-digit telephone number of "123-456-xxxx" inputted by the user, it refers to the destination data 38 to find a corresponding location of the place or facility which is determined as a destination. When it is detected that the destination data in the information center is not usable, an auxiliary destination data stored in a memory in the navigation apparatus is used to determine a corresponding destination. This embodiment is applicable when not the entire telephone number but only a part thereof (area code, for example) is inputted by the user. In this embodiment, the user is guided to an area which may be identified by a the inputted part of the telephone number. When, thereafter, the entire telephone number is inputted, the user is then guided to a destination corresponding to the inputted entire telephone number.

Figure 13:
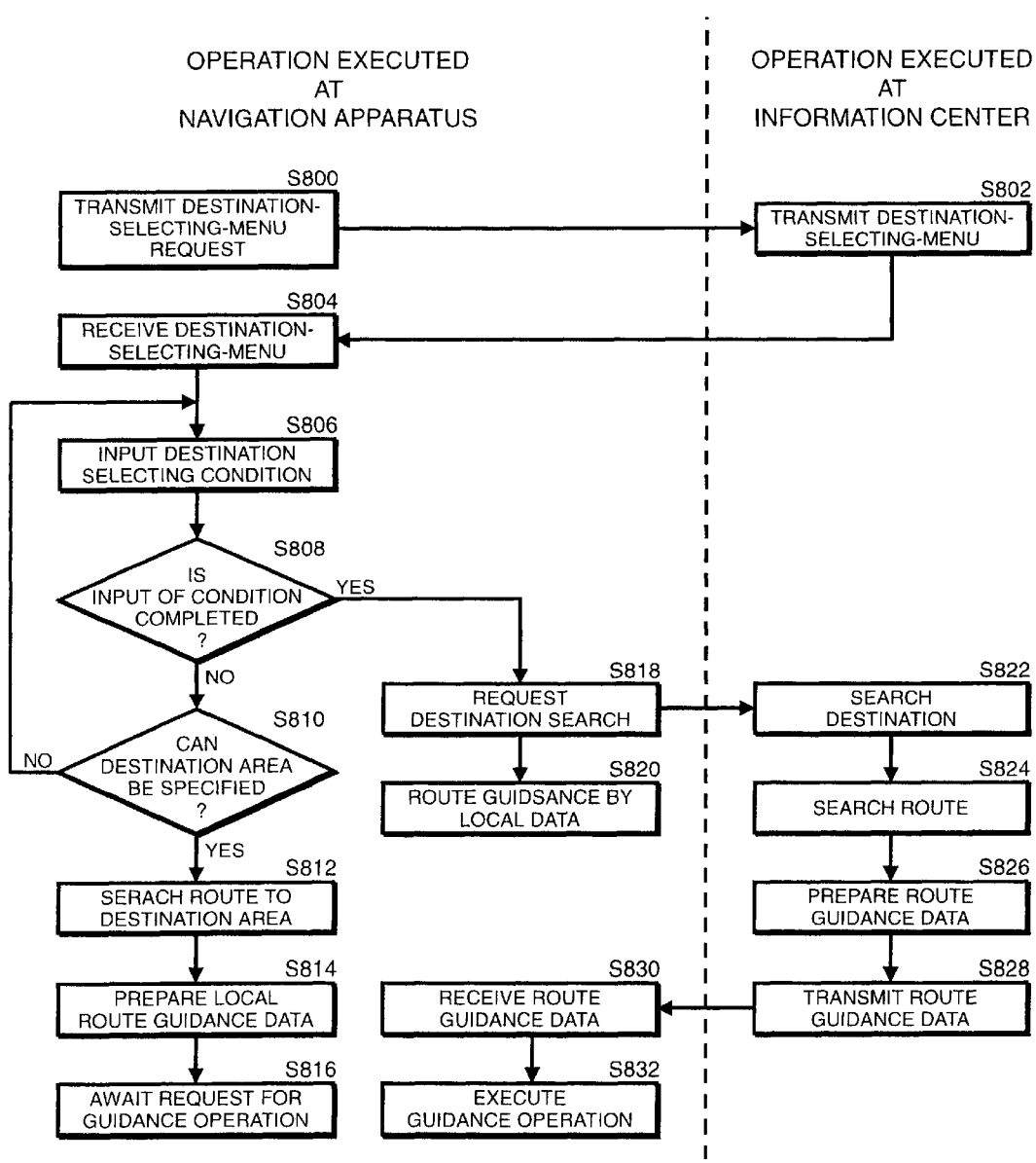
FIG. 13 is a flowchart of routines executed at both the information center and the navigation apparatus, in cooperation with each other, when only a part (an area code, for example) of a telephone number is input.

Reference should be made to a flowchart of FIG. 13 wherein steps at the left-hand column are executed by the navigation apparatus whereas steps at the right-hand column are executed by the information center.

The navigation apparatus sends a destination-selecting-menu display request to the information center (at a step S800). In response to receipt of this request, the information center transmits a destination-selecting-menu to the navigation apparatus (at a step S802). When the navigation apparatus receives the destination-selecting-menu from the information center (at a step S804), the menu is displayed at the display 106. When the user starts inputting a telephone number as a destination selecting condition (at a step S806), the navigation apparatus judges whether or not some destination area can be specified at each time of inputting a digit (at a step S810).

In preferable application of this embodiment, the memory in the navigation apparatus stores a plurality of locations representing an area which is identified by a part of the first inputted telephone number, which may be an area code. Each time of inputting a digit, it is judged that the already inputted several-digit number is sufficient to specify one of the representative locations stored in the memory in the navigation apparatus (at S810). In an example of an ten-digit telephone number of "123-456-xxxx", the memory stores the representative location of the state of Virginia, and said representative location is determined as a tentative destination when the first three digits "123" (we assume, in this example, that the area code "123" is the area code of the state of Virginia) has been inputted by the user.

When it is judged that a destination area can be specified (Yes at S810), a drive route to a representative location in the specified destination area is searched (at a step S812) and local route guidance data is prepared (at a step S814). Then it awaits commands for start guiding from the user (at a step S816). When receiving the commands for start guiding, the navigation apparatus starts the guidance operation so that the user is guided to the representative location. On the other hand, when no representative location is found in the memory corresponding the inputted first several-digit telephone number (No at S810), the navigation apparatus awaits input of an additional digit (at S806).

When the entire telephone number has been inputted by the user (Yes at S808), the navigation apparatus sends a destination searching request to the information center (at a step S818). If, at this step, it is detected that destination specifying data 38 in the information center is not usable because of being in an incommunicable area, for example, the navigation apparatus refers to its own destination specifying data to search and determine a location to be identified by the inputted entire telephone number, searches a drive route to said location, and starts guidance operation to guide the user along the searched drive route (at a step S820).

When it is detected that the destination specifying data 38 in the information center is usable, in response to receipt of the destination searching request from the navigation apparatus (at S818), the information center refers to the own destination specifying data 38 to search and determine a location to be identified by the inputted entire telephone number (at a step S822), searches a drive route to said location (at a step S824), prepares route guidance data (at a step S826) and transmits the route guidance data to the navigation apparatus (at a step S828).

In receipt of the route guidance data from the information center (at a step S830), the navigation apparatus executes guidance operation to guide the user along the drive route searched by the information center (at a step S832).

Although the present invention has been described in conjunction with specific embodiments thereof, it is to be understood that it is capable of considerable variation and modification without departure from the scope of the appended claims.

The teachings of Jananese Application 11-367,705 are incorporated by reference herein in their entirety, inclusive of the specification, claims and drawings.

We claim:

1. A communication route guidance system wherein an information center transmits route information to a mobile unit for guiding said mobile unit from its current position to a destination, in response to a request from said mobile unit, said information center comprising:

first communication means for transmitting and receiving data to and from said mobile unit;

first memory means for storing first road data;

first route search means for searching said stored first road data to obtain first route guidance data for guiding said mobile unit from said current position to said destination, each time said information center receives said request from said mobile unit, said current position and said destination being transmitted from said mobile unit through said first communication means; and data dividing means for dividing said first route guidance data into a plurality of data segments, each data segment being usable in said mobile unit as an independent item of route information providing guidance from a near end of a route segment corresponding to a data segment to the opposite, remote end of the route segment; and said mobile unit comprising:

second communication means for transmitting and receiving data to and from said information center;

second memory means for storing second road data;

second route search means for searching said second road data to obtain second route guidance data for guiding said mobile unit from said current position to said destination;

third memory means for storing at least one data segment transmitted from said information center through said first and second communication means;

sensor means for detecting whether data communication with said information center through said first and second communication means is available; and route guidance means for guiding said mobile unit to said destination in accordance with at least one of said second route guidance data and said at least one data segment stored in said third memory means, said route guidance means guiding said mobile unit to said destination in accordance with said second route guidance data when said sensor means detects that data communication between said mobile unit and said information center is not available.

2. The communication route guidance system according to claim 1 wherein said information center further comprises information collection means for obtaining latest traffic and road information, said first road data stored in said first memory means being updated in response to said latest traffic and road information obtained by said information collection means.

3. The communication route guidance system according to claim 1 wherein, when said mobile unit has been guided by said second route guidance data and when said sensor means detects that data communication with said information center is available, said first route search means conducts a new search to obtain new route guidance data for guiding said mobile unit from the current position of said mobile unit to said destination in response to said request from said mobile unit, said new route guidance data being divided by said data dividing means into a plurality of said data segments which are transmitted to said mobile unit so that said data segments are stored in said third memory means.

4. The communication route guidance system according to claim 3 wherein said sensor means comprises measurement means for measuring field intensity of a radio wave in data transmission from said information center; and means for judging that data communication with said information center is unavailable when said measured field intensity is below a predetermined threshold level.

5. The communication route guidance system according to claim 3 wherein said sensor means comprises means for judging that data communication with said information center is unavailable when said mobile unit receives no transmission of a data segment from said information center within a predetermined time period after transmitting said request to said information center.

6. The communication route guidance system according to claim 3 wherein said sensor means comprises communication area data memory means for storing data specifying, as communication areas, areas in which data communication between said mobile unit and said information center is available; and means for judging in accordance with said data stored in said communication area data memory means, that data communication between said mobile unit and said information center is unavailable when said mobile unit is not within any of said communication areas.

7. A communication route guidance system wherein an information center transmits route information to a mobile unit for guiding said mobile unit from its current position to a destination, in response to a request from said mobile unit, said information center comprising:

first communication means for receiving said current position and said destination from said mobile unit and for transmitting data to said mobile unit;

first memory means for storing road data;

route search means for searching said stored road data to obtain route guidance data for guiding said mobile unit from said current position to said destination;

data dividing means for dividing said route guidance data into a plurality of data segments, each data segment being usable in said mobile unit as an independent item of route information providing guidance for said mobile unit from a near end of a route segment corresponding to the data segment to the opposite, remote end of the route segment;

communication area data memory means for storing data identifying, as communication areas, areas in which said mobile unit is able to communicate with said information center through said first communication means; and transmission route length determining means for determining number of segments in a continuous series of said data segments to be transmitted in a single continuous transmission to said mobile unit, so as to locate a remote end of said continuous series of data segments within one of said communication areas;

said mobile unit comprising:

second communication means for transmitting said current position and said destination to said information center and for receiving said data segments from said information center;

second memory means for storing the received data segments; and route guidance means for guiding said mobile unit to said destination in accordance with said data segments stored in said second memory means.

8. The communication route guidance system according to claim 7 wherein said information center further comprises information collection means for obtaining latest traffic and road information, said road data stored in said first memory means being updated in response to said latest traffic and road information obtained by said information collection means.

9. The communication route guidance system according to claim 7 wherein said mobile unit transmits said request to said information center for guidance to said destination each time when a length of the remaining route corresponding to said continuous series of data segments which said mobile unit has received in the last transmission from said information center becomes shorter than a predetermined distance, and wherein said route search means conducts a route search to obtain route guidance data each time said information center receives said request from said mobile unit.

10. The communication route guidance system according to claim 7 wherein said mobile unit transmits said request to said information center at a predetermined, periodic time interval or at a predetermined increment of distance travelled by said mobile unit, and wherein said route search means conducts a search to obtain route guidance data for guiding said mobile unit from said current position to said destination, each time said information center receives said request from said mobile unit.

11. The communication route guidance system according to claim 7 wherein said route search means conducts a search to obtain route guidance data for guiding said mobile unit from said current position to said destination at a predetermined, periodic interval of time or at a predetermined increment of distance travelled by said mobile unit.

12. A communication route guidance system wherein an information center transmits route information to a mobile unit for guiding said mobile unit from its current position to a destination, in response to a request from said mobile unit, said information center comprising:

first communication means for transmitting and receiving data to and from said mobile unit;

first memory means for storing first road data;

first route search means for searching said first road data to obtain first route guidance data for guiding said mobile unit from said current position to said destination, said current position and said destination being transmitted from said mobile unit through said first communication means;

data dividing means for dividing said first route guidance data into a plurality of data segments, each data segment being usable in said mobile unit as an independent item of route information for guiding said mobile unit from one end of a route segment corresponding to the route segment to the other end thereof; and said mobile unit comprising:

second communication means for transmitting and receiving data to and from said information center;

second memory means for storing second road data;

second route search means for searching said second road data to obtain second route guidance data for guiding said mobile unit from said current position to said destination;

third memory means for storing at least one of said data segments transmitted from said information center through said first and second communication means;

route guidance means for guiding said mobile unit to said destination along a guide route defined by at least one of said second route guidance data and said data segments stored in said third memory means;

first sensor means for detecting whether data communication is available with said information center through said first and second communication means; and second sensor means for detecting that said mobile unit has strayed from said guide route;

wherein said second route search means conducts a route search, responsive to both detection by said second sensor means that said mobile unit has strayed from said guide route and detection by said first sensor means that data communication between said mobile unit and said information center is unavailable, to obtain restoration route guidance data for guiding said mobile unit to return to said guide route along which said mobile unit had been guided by said route guidance means before said detection by said second sensor means that said mobile unit has strayed from said guide route.

13. The communication route guidance system according to claim 12 wherein said information center further comprises information collection means for obtaining latest traffic and road information, said first road data stored in said first memory means being updated in response to said latest traffic and road information obtained by said information collection means.

14. The communication route guidance system according to claim 12 wherein said mobile unit transmits said request to said information center for guidance to said destination each time a length of the remaining route corresponding to the continuous series of said data segments which said mobile unit has received in the last transmission from said information center becomes shorter than a predetermined distance, and wherein said first route search means conducts a route search to obtain route guidance data each time said information center receives said request from said mobile unit.

15. The communication route guidance system according to claim 12 wherein said mobile unit transmits said request to said information center at a predetermined, periodic time interval or at a predetermined increment of distance travelled by said mobile unit, and wherein said first route search means conducts a search to obtain first route guidance data for guiding said mobile unit from said current position to said destination, each time said information center receives said request from said mobile unit.

16. The communication route guidance system according to claim 12 wherein said first route search means conducts a search to obtain first route guidance data for guiding said mobile unit from said current position to said destination at a predetermined, periodic interval of time or at a predetermined increment of distance travelled by said mobile unit.

17. A communication route guidance system wherein an information center transmits route information to a mobile unit for guiding said mobile unit from its current position to a destination, in response to a request from said mobile unit, said information center comprising:

first memory means for storing first location data capable of specifying a location by input of at least one of telephone number and address thereof; and first route search means for searching said first location data to obtain first route guidance data for guiding said mobile unit from said current position;

said mobile unit comprising:

input means for inputting at least one of a telephone number and address for said destination, as destination information;

communication means for transmitting said current position and said destination information to said information center and receiving said first route guidance data from said information center;

second memory means for storing second location data capable of specifying a location by designation of said destination information;

sensor means for detecting whether data communication with said information center is available through said communication means;

second route search means for searching said second location data to obtain second route guidance data for guiding said mobile unit from said current position to said destination, when said sensor means detects that said information input by said input means can not be transmitted to said information center; and route guidance means for guiding said mobile unit to said destination in accordance with at least one of said first and second route guidance data.

18. The communication route guidance system according to claim 17 wherein, when said mobile unit is travelling under guidance of said second route guidance data and said sensor means detects that data communication with said information center has become available, in response to said request from said mobile unit said first route search means conducts a search to obtain new route guidance data for guiding said mobile unit from its current position to said destination, whereby said route guidance means guides said mobile unit in accordance with said new route guidance data and transmitted from said information center to said mobile unit.

19. The communication route guidance system according to claim 17 wherein said second location data stored in said second memory means includes data specifying a representative location within an area including a location to be designated by input of said telephone number or said address through said input means.

20. The communication route guidance system according to claim 17 wherein said sensor means comprises measurement means for measuring field intensity of a radio wave in data transmission from said information center and means for judging that data communication with said information center is unavailable when said measured field intensity is below a threshold level.

21. The communication route guidance system according to claim 17 wherein said sensor means comprises means for judging that data communication with said information center is unavailable when said first route guidance data has not been received by said mobile unit from said information center within a predetermined time period after transmitting said request to said information center.

22. The communication route guidance system according to claim 17 wherein said sensor means comprises communication area memory means for storing data specifying, as communication areas, areas in which said mobile unit is able to communicate data to and from said information center and means for judging, in accordance with said data stored in said communication area memory means, that data communication between said mobile unit and said information center is unavailable when said mobile unit is not within any of said communication areas.

* * * * *